United States Patent
Niimi

(10) Patent No.: US 7,132,798 B2
(45) Date of Patent: Nov. 7, 2006

(54) JOINED BODIES, HIGH PRESSURE DISCHARGE LAMPS AND ASSEMBLIES THEREFOR

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 215 days.

(21) Appl. No.: 10/427,937

(22) Filed: May 2, 2003

(65) Prior Publication Data

US 2003/0209984 A1   Nov. 13, 2003

(30) Foreign Application Priority Data

May 10, 2002 (JP) ............................. 2002-135672
Nov. 21, 2002 (JP) ............................. 2002-337387
Dec. 26, 2002 (JP) ............................. 2002-376017

(51) Int. Cl.
*H01J 61/30* (2006.01)

(52) U.S. Cl. .................. 313/634; 313/623; 313/624; 313/625

(58) Field of Classification Search ................ 313/503, 313/504, 506, 634, 623–625; 428/432, 469, 428/698, 701, 702
See application file for complete search history.

(56) References Cited

U.S. PATENT DOCUMENTS

| 5,330,838 A | * | 7/1994 | Dyer et al. .................. 428/408 |
| 5,404,078 A | * | 4/1995 | Bunk et al. .................. 313/625 |
| 5,424,608 A | | 6/1995 | Juengst et al. |
| 5,552,670 A | | 9/1996 | Heider et al. |
| 5,742,126 A | * | 4/1998 | Fujii et al. ................... 313/635 |
| 5,861,714 A | * | 1/1999 | Wei et al. .................... 313/625 |
| 5,866,982 A | * | 2/1999 | Scott et al. .................. 313/634 |
| 6,020,685 A | * | 2/2000 | Wei et al. .................... 313/625 |
| 6,635,993 B1 | * | 10/2003 | Niimi .......................... 313/623 |
| 2002/0033670 A1 | | 3/2002 | Niimi |
| 2002/0033671 A1 | | 3/2002 | Niimi |

FOREIGN PATENT DOCUMENTS

| EP | 0 982 278 A1 | 3/2000 |
| JP | A 2001-58882 | 3/2001 |

* cited by examiner

*Primary Examiner*—Ashok Patel
*Assistant Examiner*—Anthony Canning
(74) *Attorney, Agent, or Firm*—Oliff & Berridge, PLC

(57) ABSTRACT

The present invention provides a joined body having a first member 7, a second member 4 and a joining material 14 interposed between the first and second members. The joining material has a porous bone structure 15 with open pores and made of a sintered product of metal powder and impregnated phase 10 impregnated into the open pores. The impregnated phase 10 includes an oxynitride glass. The joined body has improved resistance against fatigue and fracture, even when the body is subjected to thermal cycles between high and room temperatures and held at a high temperature over a long period of time.

29 Claims, 18 Drawing Sheets
(1 of 18 Drawing Sheet(s) Filed in Color)

JOINED BODIES, HIGH PRESSURE DISCHARGE LAMPS AND ASSEMBLIES THEREFOR

This application claims the benefits of Japanese Patent Applications P2002-135672, filed on May 10, 2002, P2002-337387, filed on Nov. 21, 2002 and P2002-376017, filed on Dec. 26, 2002. the entireties of which are incorporated by reference.

BACKGROUND OF THE INVENTION

1. Field of the Invention

The present invention relates to a joined body, a high pressure discharge lamp and an assembly therefor.

2. Description of the Related Art

A high pressure discharge lamp has a ceramic discharge vessel with two end portions. Sealing members (usually referred to as a ceramic plug) are inserted, respectively, in the end portions to seal them. A through hole is formed in each sealing member. A metal member with an electrode system is inserted in the through hole. An ionizable light-emitting material is introduced and sealed in the inner space of the discharge vessel Known high pressure discharge lamps include high pressure sodium vapor and metal halide lamps, the latter exhibiting more superior color coordination. The lamp may be used in high temperature condition by forming the discharge vessel by a ceramic material.

In such discharge lamp, it is necessary to air-tightly seal between the end portion of the ceramic discharge vessel and a member for supporting an electrode system. The vessel has a main body with a shape of a tube with two narrow ends, or a barrel or a straight tube. The discharge vessel is made of, for example, an alumina sintered body.

A Japanese patent publication No. 2001-58, 882A (EP 0982278, A1) disclose the following structure. A joining portion is provided between the end portion of a ceramic discharge vessel and a member for supporting an electrode system. The joining portion has a joining material contacting the discharge vessel and an intermediate layer contacting the supporting member and existing between the supporting member and the joining material. The joining material is composed of a porous bone structure with open pores and made of a sintered product of metal powder. The joining material further has ceramic phase impregnated into the open pores in the bone structure. Herewith, such joined body has improved air-tightness and resistance against corrosion, so that repeated thermal cycles does not result in the fracture of the joined body.

SUMMARY OF THE INVENTION

The inventor further examined the above sealing structure and tried to provide a joined structure having resistance against fatigue and fracture, even when the structure is subjected to repeated thermal cycles between a high temperature and room temperature. He has further studied a lamp having resistance against fracture and leakage, when the lamp is turned on over a long period of time at a temperature as high as possible.

It is an object of the invention to provide a joined structure having improved resistance against fatigue and fracture, when the body is subjected to repeated thermal cycles between high and room temperatures and held at a high temperature over a long period of time.

It is another object of the invention to provide a high pressure discharge lamp having excellent air-tightness and improved resistance against fatigue and fracture, when the lamp is subjected to lightening cycles and turned on at a high temperature over a long period of time.

The present invention provides a joined body having a first member, a second member and a joining material interposed between the first and second members. The joining material has a porous bone structure with open pores formed therein and made of a sintered product of metal powder and impregnated phase impregnated into the open pores of the structure. The impregnated phase comprises an oxynitride glass.

The present invention further provides an assembly for a high pressure discharge lamp having a ceramic discharge vessel with an inner space formed therein and end portions, an electrode system provided in the inner space; and the above joined body. An ionizable light-emitting material and a starter gas are to be contained in the inner space, and an opening is formed in the end portion. The first member is a metal member, the second member is a sealing member, the metal and sealing members are air-tightly sealed, and the sealing member has a through hole formed therein. At least a part of the sealing member is fixed in the opening of the discharge vessel.

The present invention further provides an assembly for a high pressure discharge lamp having the above joined body. The first member is a metal member, and the second member is a ceramic discharge vessel having an inner space formed therein and end portions. An electrode system is provided in the inner space. An ionizable light-emitting material and a starter gas are to be contained in the inner space, and an opening is formed in the end portion wherein the metal member and said discharge vessel are air-tightly sealed.

The present invention further provides a high pressure discharge lamp having any one of the above assemblies, wherein an ionizable light-emitting substance and a starter gas are filled in the inner space of the discharge vessel.

The joined body of the present invention includes the joining material having a porous bone of a sintered body of metal powder and with open pores and impregnated phase impregnated into the open pores. Such microstructure including the combination of the porous bone structure and impregnated phase may be effective for dispersing or relaxing the stress due to a difference of thermal expansion between the first and second members. In addition to this, the impregnated phase in the bone structure is composed of an oxynitride glass, according to the present invention. It is proved that the resistance with respect to thermal cycles and thermal resistance against a high temperature over a long time may be considerably improved. The present invention is based on the discovery.

The reasons might be considered as follows.

(1) The joining material of the present invention has the above microstructure including the combination of the porous bone and impregnated phase effective for dispersing the stress. In the microstructure, however, it is considered that strain is induced and remains in the impregnated phase after a cooling step of the sintering process due to a difference of thermal expansion between the porous bone and impregnated phase. The strain in the impregnated phase may be enlarged after thermal cycles. Contrary to this, an oxynitride glass constituting the impregnated phase generally has a small thermal expansion which may be made close to that of the porous bone structure. A difference between thermal expansion between the porous bone structure and impregnated phase may be reduced, so that the stress in the impregnated phase may be reduced.

(2) Further, the oxynitride glass generally has a Young's modulus lower than that of a polycrystalline material, and thus may be easily deformed when a stress is applied. As a result, the stress hardly remains microscopically in the impregnated phase after the cooling step, in which a stress is applied from the porous bone structure to the impregnated phase.

(3) Further, an oxynitride glass has a softening point (glass transition point) higher than that of a conventional oxide glass having the similar composition as the oxynitride glass. It is thus possible to prevent the softening of the glass after the joined body is maintained at a high temperature over a long period of time.

The properties (1) to (3) of the oxynitride glass contribute together to the characteristics of the inventive joined body, which is resistive against fracture or gas leakage in the joining portion after the joined body is subjected to many thermal cycles or maintained at a high temperature over a long period of time.

Further, contrary to a polycrystalline material, volumetric shrinkage does not hardly occur during the solidification process. It is thus possible to prevent the formation of spaces between the glass and metal bone structure due to the shrinkage of the glass, so that the air-tightness may be assured. The joined body according to the present invention is thus particularly useful for an application requiring air-tightness such as a high pressure discharge lamp described below. When the crystallinity of the oxynitride glass is too high, the volumetric shrinkage may be easily induced. The crystallinity of the oxynitride glass may preferably be not higher than 70 percent for further improving the air-tightness of the joined body. An oxynitride glass is superior and suitable than a conventional oxide glass in that the oxynitride glass has a crystallization temperature higher than that of the oxide glass.

Further, the present invention provides a high pressure discharge lamp and an assembly therefor having improved resistance. That is, it is possible to provide a joining portion having improved resistance against fatigue to prevent the fracture, even after the lamp is subjected to many turning-on and off cycles and maintained at a high temperature over a long period of time. The reasons of improved resistance of such lamp might be considered as follows.

An oxynitride glass generally has a small thermal expansion which may be made close to those of the discharge vessel and sealing member (described below) of a high pressure discharge lamp. It is thus possible to reduce the deformation of the glass.

An oxynitride glass generally has a Young's modulus lower than that of a polycrystalline material, and thus may be easily deformed when a stress is applied. As a result, the stress hardly remains microscopically in the impregnated phase after the cooling step, in which a stress is applied from the porous bone structure to the impregnated phase.

Further, an oxynitride glass has a softening point (glass transition point) higher than that of a conventional oxide glass having the similar composition as the oxynitride glass. It is thus possible to prevent the softening of the glass after it is held at a high temperature over a long time.

These properties of the oxynitride glass contribute together to the characteristics of the inventive lamp, which is resistive against fracture in the joining portion after the lamp is subjected to many lightening cycles or maintained at a high temperature over a long time.

The present invention still further provides a method of producing a joined body of first and second members having a joining material between the first and second members. The joining material contains an oxynitride glass. According to the method, raw material for the oxynitride glass is subjected to a heat treatment under atmosphere of hydrogen and nitrogen at a volume ratio of 25:75 to 50:50 to generate the oxynitride glass.

When the volume ratio of hydrogen exceeds 50 percent, the contents of silicon and nitrogen components are reduced during the heat treatment It becomes thus difficult to generate an oxynitride glass with a desired composition. When the volume ratio of hydrogen is not higher than 25 percent, it is proved that an oxynitride glass is not generated after cooling the melt of a composition for an oxynitride glass. Although the reason is not clear, the reduction of the thermal conductivity may contribute. However, an oxynitride glass may be generated even when the volume ratio of hydrogen to nitrogen is out of the above range. For example, a means for rapid cooling may be provided in a system for glass formation to prevent the crystallization.

In a preferred embodiment, the second member is composed of an oxide containing a rare earth element, and 1 weight part of the joining material is subjected to the heat treatment with 0.15 to 1.5 weight parts of silica. The co-sintering of silica is effective for preventing the decomposition and volatilization of an N component and foaming of the glass during a melting step of a composition for an oxynitride glass. When the content of silica is lower than 0.15 weight part, the oxynitride glass is hardly generated. When the content of silica is higher than 1.50 weight part, the surface of the second member is vitrified and turbided to white.

Further in a preferred embodiment, the second member comprises an oxide containing a rare earth element, and the atmosphere for the heat treatment has a dew point of not lower than −5° C. and not higher than +30° C. That is, a member containing a rare earth element is susceptible to blackening due to lattice defect of oxygen atoms. Such blackening may be further progressed particularly in a reducing atmosphere. The presence of a some degree of hydrogen is, however, indispensable for glass generation as described above. Even in this case, however, it is possible to prevent the blackening of the second member by humidifying the atmosphere in a furnace.

The oxide having a rare earth element may be a rare earth oxide or a composite oxide containing oxygen, a rare earth element and the other element such as aluminum. The composite oxide may have a crystalline system of, for example, garnet or perovskite phase. The oxide may most preferably be YAG (yttrium-aluminum garnet).

The effects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 11 is a cross sectional view schematically showing another embodiment of an end portion of the inventive lamp, wherein a metal member 7 is joined to an end portion 1a of a discharge vessel 1 and a metal element 7 and a metal axis 27 of an electrode system 27 are electrically connected with a metallized layer 32, covering the surface of the end portion 1a.

DESCRIPTION OF THE PREFERRED EMBODIMENTS

The present invention will be described further in detail referring to the attached drawings. FIGS. 1 to 5 show a high pressure discharge lamp with an end portion to which the present invention is applied.

Figure 1:
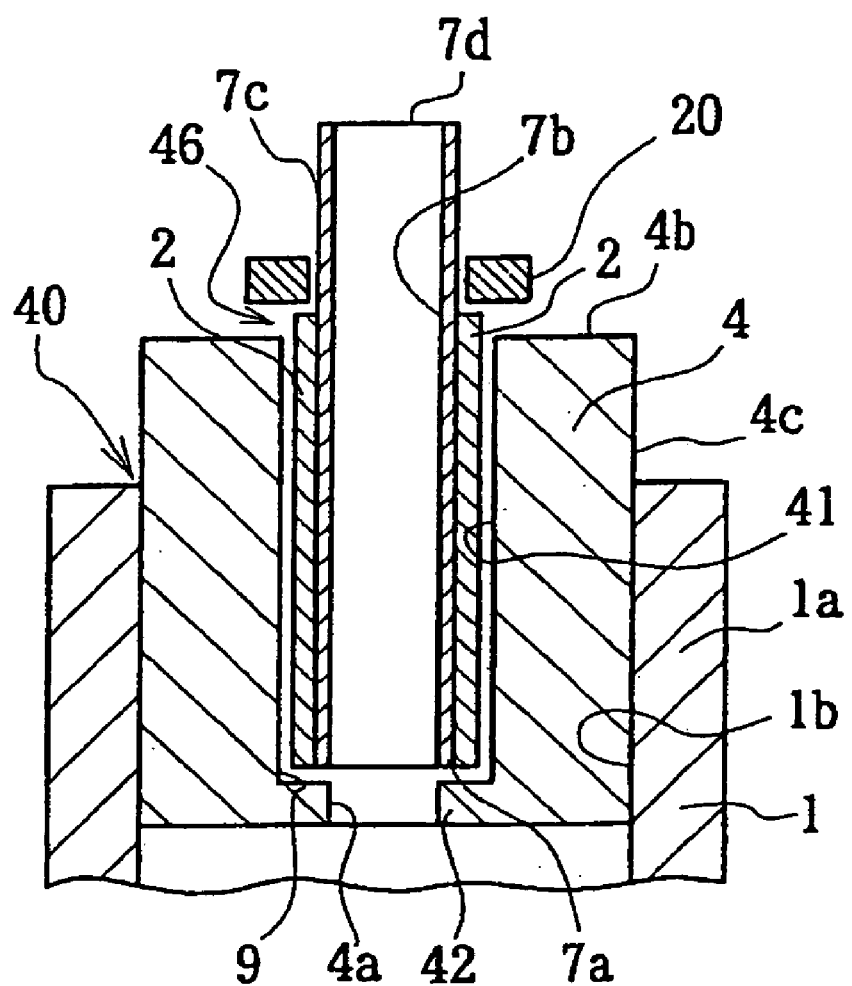
FIG. 1 is a cross sectional view schematically showing a sealing member 4, a metal member 7 and a porous bone structure 2 provided between the members, in one embodiment of the invention.
Figure 3:
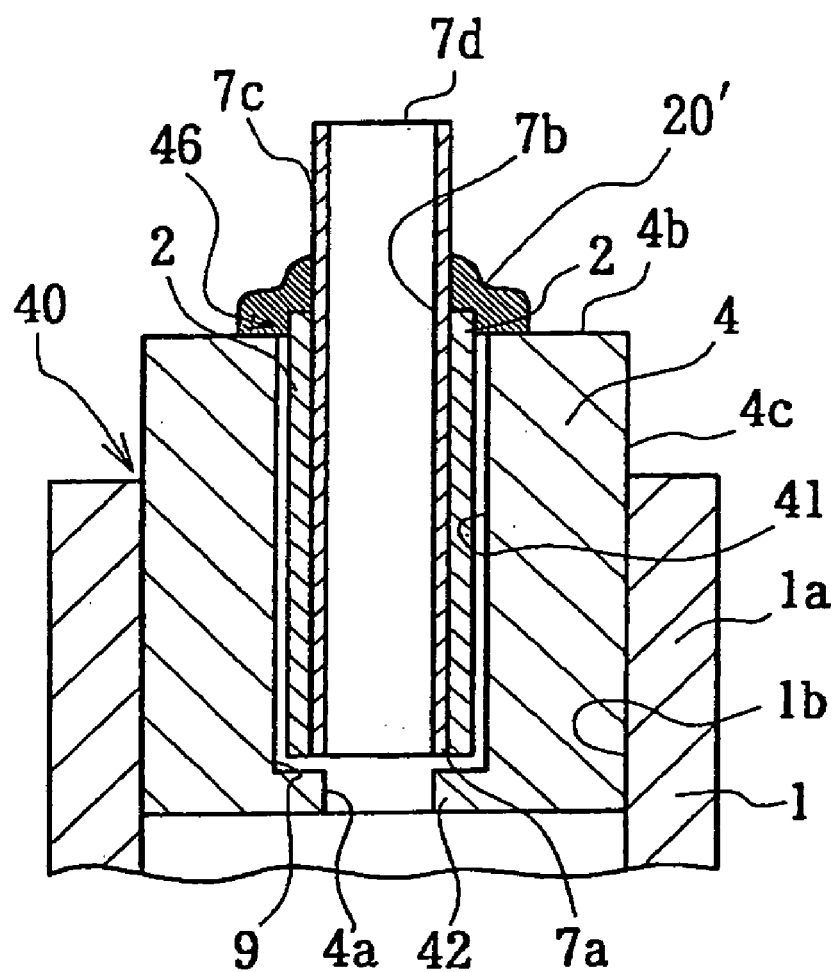
FIG. 3 is a cross sectional view schematically showing a sealing member 4, a metal member 7 and a porous bone structure 2 provided between the members in another embodiment of the present invention.

As shown in FIGS. 1 and 3, an inner wall surface 1b of an end portion 1a of a ceramic discharge vessel 1 is formed so as to extend straightforwardly in the direction of the central axis of the vessel. A part of a sealing member 4 is inserted within an opening 40 of the end portion 1a. 4c represents an outer surface and 46a through hole of the sealing member 4.

A depression or hollow 9 is formed on the inner wall surface 4a of the sealing member 4. A metal member 7 is held in the hollow 9. In the embodiment, the metal member 7 has a shape of a tube and an opening is formed in its end portion 7d. The opening is sealed after introducing a starter gas and an ionizable light-emitting substance. 7b represents an inner surface and 7c an outer surface of the metal member 7. An inner space of the metal member 7 is commuted with an inner space of the discharge vessel 1 (described below). A protrusion 42 is provided on the sealing member 4 and opposes an end portion 7a of the metal member 7, so as to fix the metal member at a specified position.

As shown in FIG. 1, the inventor provided a porous bone structure 2, made of a sintered product of metal powder and with open pores between the metal member 7 and sealing member 4. A ceramic material ring 20 was then positioned on the bone structure 2. The melting point of the bone structure 2 is adjusted so as to exceed that of the ceramic material.

Figure 2:
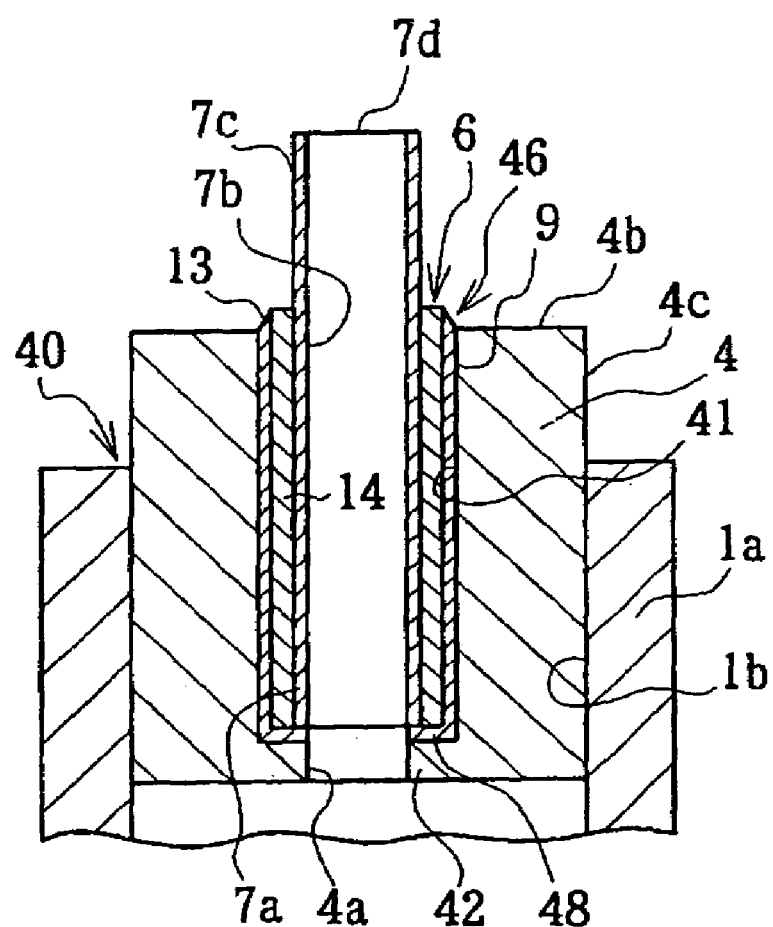
FIG. 2 is a cross sectional view schematically showing a joined body according to the invention.

When the glass composition is melted, as schematically shown in FIG. 2, the inventor found that the molten composition was impregnated into the open pores to form joining material 14. The material 14 has the porous bone structure and impregnated phase impregnated into the open pores. The inventor further found that the thus molten composition is flown into the interface of the sealing member 4 and the joining material 14 so that the bone structure is slightly floated from the surface of the sealing member 4. An intermediate layer 13 may be thus formed. The joining material 14 and intermediate layer 13 together form a joining portion 6 joining the metal member 7 and sealing member 4. 41 represents a joint interface of the sealing member 4; The joining portion 6 extends to the region near the protrusion 42. A glass layer 48 is formed between the protrusion 42 and the end portion 7a of the metal member 7.

As shown in FIG. 3, it is also possible to apply paste of glass composition 20' on the peripheral parts of the metal member 7, the bone structure 2 and the sealing member 4, instead of positioning the glass material ring 20 on the bone structure 2. Each of the glass compositions 20 and 20' may generate an oxynitride glass after the melting and cooling steps.

Figure 4:
FIG. 4 is a photograph, taken by a scanning type electron microscope, showing a joining portion between metal and sealing members.
Figure 5:
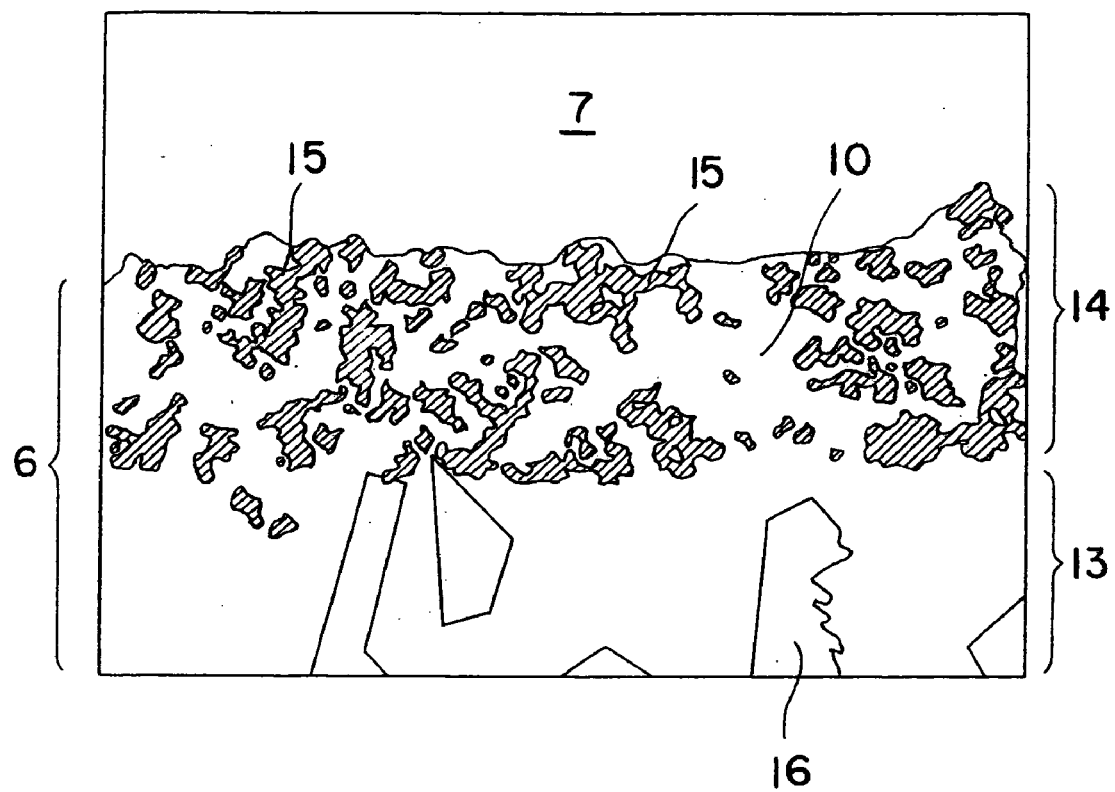
FIG. 5 is a diagram illustrating the photograph of FIG. 4.

A typical example of such joining structure will be explained referring to FIGS. 4 and 5. FIG. 4 is a scanning type microscopic photograph of a joining material and FIG. 5 is a diagram illustrating the photograph of FIG. 4.

A joining portion 6 is formed between the sealing member (second member) 4 and metal member (first member) 7. The joining portion 6 is composed of a joining material 14 present in the side of the metal member 7 and an intermediate layer 13 between the sealing member 4 and joining material 14. In the present example, the joining material 14 is contacted with the metal member 7 and the intermediate layer 13 is contacted with the sealing member 4. In a photograph shown in FIG. 4, gray or black region corresponds with the sealing member 4 and thin gray region corresponds with the metal member 7. Whitish region 15 corresponds with a metal and gray region 10 corresponds with the impregnated phase in the joining material 14. It is proved that some alumina particles 16 (dark crystalline particles) are dispersed in the intermediate layer 13. The alumina particles 16 are derived from alumina particles in the sealing member 4 remaining in the intermediate glass layer. In FIGS. 4 and 5, the sealing member 4 is observed under the alumina particles 16.

According to the above process, the glass composition 20 or 20' is set around the porous bone structure and molten and impregnated into the pores of the bone structure. During the process, a part of the molten composition is diffused into the gap between the bone structure and metal member so that the bone structure is slightly floated on the molten composition.

The thus produced joining material has a high strength, a relatively small thermal expansion and improved resistance against thermal shock and thermal cycles. Particularly when the second member is made of a ceramics or cermet having a relatively small thermal expansion, the tensile strength applied on the joining material from the second member is small so that the resistance against thermal cycles may be improved. In addition to this, the joining material has excellent resistance against a corrosive substance such as a metal halide. It is thus possible to prevent the corrosion of the joining material when it is exposed to a corrosive substance at a high temperature over a long period of time.

Each part of the joined body according to the present invention will be further described.

The porous bone structure is made of a sintered product of metal powder. The metal powder may preferably be made of a metal selected from the group consisting of molybdenum, tungsten, rhenium, niobium, tantalum and the alloys thereof For further improving the resistance of the structure against a halogen, a metal selected from the group consisting of molybdenum, tungsten, rhenium and the alloys thereof is particularly preferred.

The porous bone structure may preferably has a porosity, of open pores, of not lower than 15%, and more preferably not lower than 40%, thus improving the strength of the joining material. The porosity may preferably be not higher than 80%, and more preferably be not higher than 70%. It is thereby possible to effectively impregnate the ceramic into the open pores of the bone structure and to disperse the stress applied on the structure so that the resistance against repeated thermal cycles may be improved.

In the present invention, the impregnated phase is composed of an oxynitride glass and intermediate layer may preferably be composed of an oxynitride glass. The oxynitride glass will be described below.

An oxynitride glass is a glass containing silicon, nitrogen and oxygen atoms coexisting therein. It is necessary that raw material contains at least a metal oxide, a silicon compound and nitrogen compound for obtaining an oxynitride glass.

The metal oxide includes $Al_2O_3$, $SiO_2$, $MgO$ and $ZrO$. The rare earth oxide includes $Sc_2O_3$, $Y_2O_3$, $La_2O_3$, $Gd_2O_3$, $Dy_2O_3$, $Ho_2O_3$ and $Tm_2O_3$.

The silicon compound includes silicon oxide, silicon nitride and sialon (SiAlON). Among them, silicon nitride and sialon belong to a nitride. When silicon nitride or sialon is applied, the other nitride is not thus necessary.

The nitride includes silicon nitride, sialon, aluminum nitride and boron nitride.

Particularly preferably, the raw material has either of the following compositions.
(1) (a) silicon oxide, (b) a metal oxide other than silicon oxide, and (c) a nitride, and optionally another component(s)
(2) (a) an oxide other than silicon oxide, and (b) silicon nitride, and optionally another component(s)

In a preferred embodiment, the metal oxide further includes at least a rare earth oxide. Particularly preferably, the oxynitride glass is made from a rare earth oxide, one or more oxide selected from the group consisting of $Al_2O_3$, $ZrO_2$, $MgO$, $SiO_2$ and $B_2O_3$, and a nitride.

The rare earth oxide is the oxide or oxides of one or more element selected from the group consisting of samarium, scandium, yttrium, lanthanum, cerium, praseodymium, neodymium, promethium, europium, gadolinium, terbium, dysprosium, holmium, erbium, thulium, ytterbium and rhutenium. Particularly preferably, the rare earth oxide is one or more oxide(s) selected from the group consisting of $Sc_2O_3$, $Y_2O_3$, $La_2O_3$, $Gd_2O_3$, $Dy_2O_3$, $Ho_2O_3$ and $Tm_2O_3$.

In a preferred embodiment, the metal oxide includes alumina. It is thus possible to further improve the resistance against a corrosive substance of the joining material and intermediate layer.

In a preferred embodiment, the metal oxide may contain one or more oxide(s) selected from the group consisting of $SiO_2$, $MoO_2$ and $MoO_3$.

In a preferred embodiment, the oxynitride glass is made from one of the following compositions.

Composition (A)
A rare earth oxide: not lower than 5 mol percent and not higher than 60 mol percent (more preferably not lower than 10 mol percent, or, not higher than 50 mol percent)
Silicon oxide: not lower than 5 mol percent and not higher than 20 mol percent (more preferably not lower than 8 mol percent, or, not higher than 15 mol percent)
Alumina: not lower than 20 mol percent and not higher than 60 mol percent (more preferably not lower than 25 mol percent, or, not higher than 50 mol percent)
Aluminum nitride: not lower than 10 mol percent and not higher than 40 mol percent (more preferably not lower than 15 mol percent, or, not higher than 30 mol percent)

Composition (B)
A rare earth oxide: not lower than 5 mol percent and not higher than 60 mol percent (more preferably not lower than 10 mol percent, or, not higher than 50 mol percent)
Silicon oxide: not higher than 20 mol percent (more preferably not lower than 2 mol percent, or, not higher than 15 mol percent)
Alumina: not lower than 20 mol percent and not higher than 60 mol percent (more preferably not lower than 25 mol percent, or, not higher than 50 mol percent)
Aluminum nitride: not lower than 3 mol percent and not higher than 18 mol percent (more preferably not lower than 5 mol percent, or, not higher than 15 mol percent)

The oxynitride glass may most preferably has one of the following compositions.

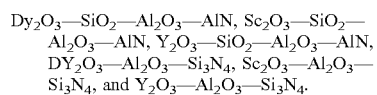

$Dy_2O_3$—$SiO_2$—$Al_2O_3$—AlN, $Sc_2O_3$—$SiO_2$—$Al_2O_3$—AlN, $Y_2O_3$—$SiO_2$—$Al_2O_3$—AlN, $DY_2O_3$—$Al_2O_3$—$Si_3N_4$, $Sc_2O_3$—$Al_2O_3$—$Si_3N_4$, and $Y_2O_3$—$Al_2O_3$—$Si_3N_4$.

The content of silicon atoms may preferably be not lower than 7 atomic percent in the oxynitride glass. It is thus possible to improve the glass formation of the composition and to improve Young's modulus of the glass. On this viewpoint, the content of silicon atoms may more preferably be not lower than 8 atomic percent.

In the oxynitride glass, the content of silicon atoms may preferably be not lower than 20 atomic percent. It is thus possible to improve the thermal resistance of the joining material. On this viewpoint, the content of silicon atoms may preferably be not higher than 15 atomic percent.

The content of nitrogen atoms in the oxynitride glass may preferably be not higher than 4 atomic percent in the oxynitride glass. It is thus possible to improve the thermal resistance of the joining material. On this viewpoint, the content of nitrogen atoms in the oxynitride glass may more preferably be not higher than 6 atomic percent.

Further, on the viewpoint of improving the uniformity of microstructure of the glass, the content of nitrogen atoms in the oxynitride glass may preferably be not higher than 20 atomic percent and more preferably be not higher than 18 atomic percent.

When the joining material of the present invention is produced, raw composition for the oxynitride glass is impregnated into the porous bone structure to generate the impregnated phase. The intermediate layer may preferably be produced simultaneously. Although the temperature for melting the raw composition is not particularly limited, it is preferred that the porous bone structure, discharge vessel and sealing member are not adversely affected during the melting step. On this viewpoint, the temperature may preferably be not higher than 1800° C. Further, the temperature may preferably be not higher than 1600° C. for melting the raw composition uniformly.

An inert gas, an ionizable light-emitting substance and optionally mercury may be introduced into the inner space of the discharge vessel. Alternatively, mercury is not contained and a high pressure inert gas such as xenon gas may be used. The high pressure discharge lamp according to the present invention may be applied to not only a lamp for general lighting but also a head lamp for a vehicle.

The inventive joined body may be widely applied to, other than a high pressure discharge lamp, all the structural bodies, such as a switching device of vacuum, having a conductive portion or terminal whose air-tightness at a high temperature of about 900° C. is indispensable. The joined body may also be applied to applications that the body is to be exposed to a corrosive gas, particularly a halogen-based corrosive gas.

The first and second members may be made of a material not particularly limited including a ceramics, metal and cermet. Preferably, the first member is made of a metal and the second member is made of a ceramics or cermet.

The metal member may be made of one or more metal selected from the group consisting of molybdenum, tungsten, rhenium, niobium, tantalum and alloys thereof Among them, niobium and tantalum have thermal expansion coefficients matching with that of a ceramic, especially alumina ceramic, constituting a ceramic discharge vessel. However, it is known that niobium and tantalum are susceptible to corrosion by a metal halide. Therefore, it is desirable to form a metal member with a metal selected from the group consisting of molybdenum, tungsten, rhenium and the alloys thereof, for improving the life of the metal member. However, such metals, with high corrosion resistance against a metal halide, generally have a low thermal expansion coefficient. For example, alumina ceramic has a thermal expansion coefficient of $8 \times 10^{-6}$ $K^{-1}$, molybdenum has that of $6 \times 10^{-6}$ $K^{-1}$, and tungsten and rhenium have those of not more than $6 \times 10^{-6}$ $K^{-1}$. In such a case, as described above, the inventive joined structure effectively relaxes the stress due to the difference of the thermal expansion coefficients of the metal member and discharge vessel or sealing member.

Molybdenum is suitably used for the invented structure in such advantages that it has high corrosion resistance against a metal vapor, particularly a metal halide gas, and that it has high wettability to a ceramic.

When molybdenum is used as a material of a metal member, at least one of $La_2O_3$ and $CeO_2$ may preferably be added to molybdenum in a ratio of 0.1 to 2.0 weight percent as a total.

The main components of the metals constituting the metal member and constituting the porous bone structure may preferably be the same and more preferably molybdenum. Such (main component) means that the component constitutes not lower than 60 weight percent of the metal.

The second member (for example a sealing member or light-emitting vessel) may be made of a ceramic or cermet. The ceramic may preferably be a ceramic alone, selected from the group consisting of alumina, magnesia, yttria, lanthania and zirconia, or the mixed compound thereof.

More specifically, the sealing member may be made of the same or the different kind of material as that of the ceramic discharge vessel. When the electric conductor is made of niobium or tantalum, the discharge vessel and sealing member may preferably be made of the same kind of ceramics. Because in this case the thermal expansion coefficient of the electric conductor is approaching those of the discharge vessel and sealing member. Such (same kind of material) means that their base components of the ceramic materials are the same and the added component or components may be the same or different with each other.

When the metal member is made of molybdenum, tungsten, rhenium or the alloys thereof, the difference of the thermal expansion coefficients of the ceramic discharge vessel and metal member are relatively large. Therefore, it is preferable to adjust the thermal expansion coefficient of the sealing member between those of the electric conductor and the end portion of the discharge vessel. For that reason, the sealing member may be formed of a cermet.

A cermet is a composite material of a ceramic and a metal. Such ceramic may preferably be a ceramic alone, selected from the group consisting of alumina, magnesia, yttria, lanthania and zirconia, or the mixed compound thereof. The ceramics may more preferably be the same kind of ceramic as that of the ceramic discharge vessel, thereby making it possible to co-fire the discharge vessel and sealing member. On this point of view, the ceramic components of the discharge vessel and cermet may more preferably be alumina ceramic.

The metal component of the cermet may preferably be a metal having a high melting point and resistance against a metal halide, such as tungsten, molybdenum, rhenium or the like, or the alloys thereof. It is thus possible to improve the resistance of the sealing member against a metal halide. The cermet may preferably has not lower than 55 weight percent and more preferably not lower than 60 weight percent, of the ceramic component of the cermet (the balance is a metal component.).

Preferably, each of materials constituting the intermediate layer and impregnated phase has a melting point not higher than a temperature subtracted 200° C. from a melting point of a ceramic or a cermet constituting the second member. It is thus possible to considerably reduce crack formation in grain boundaries in the second member. In this case, the melting point of each material is not lower than 1500° C. for securing the reliability of the joining material.

On the view point of wettability, each ceramic may preferably contain a main component of the ceramic or cermet constituting the second member. The "main component" herein means a ceramic component constituting 70 weight percent or more of the ceramic, or a ceramic component constituting 60 weight percent or more of the cermet.

The above described joining material according to the present invention may be applied to both ends of a ceramic discharge vessel. However, in one end, it is preferred to apply a tubular-shaped metal member for introducing an ionizable light-emitting substance through the metal member into the inner space of the vessel. In the other end, metal members with various shapes such as a rod, a tube or the like may be applied.

The shape of the metal member may preferably be a tube for defining a clearance. The shape of a ceramic discharge vessel is not particularly limited, and includes a tube, a cylinder, a barrel or the like. When the metal member is a tubular shaped member supporting an electrode system, an ionizable light-emitting substance may be introduced into the inner space of the discharge vessel through the metal member. The electrode-system-supporting member is then sealed by laser welding or TIG welding. When using laser welding, for example, Nd/YAG laser is used, In this case, a clearance between the electrode-supporting member and the electrode to be inserted into the metal member may preferably be between 30 and 150 µm in radial directions. The reason is as follows. If the clearance is too large, the light-emitting material tends to accumulate in the clearance so that the unevenness of the property increases. If the clearance is too small, the electrode system substantially contacts the electrode-system-supporting member and the thermal stress in the joining material thereof increases so that there is a tendency to break the joining material.

FIGS. 1, 2, 3, 6, 7 and 8 show the steps in a process of producing the end portion of the lamp according to the present invention. A joining portion 6 of the invention is interposed between a sealing member 4 and a metal member 7 to join them with each other and to secure air-tightness.

Figure 6:
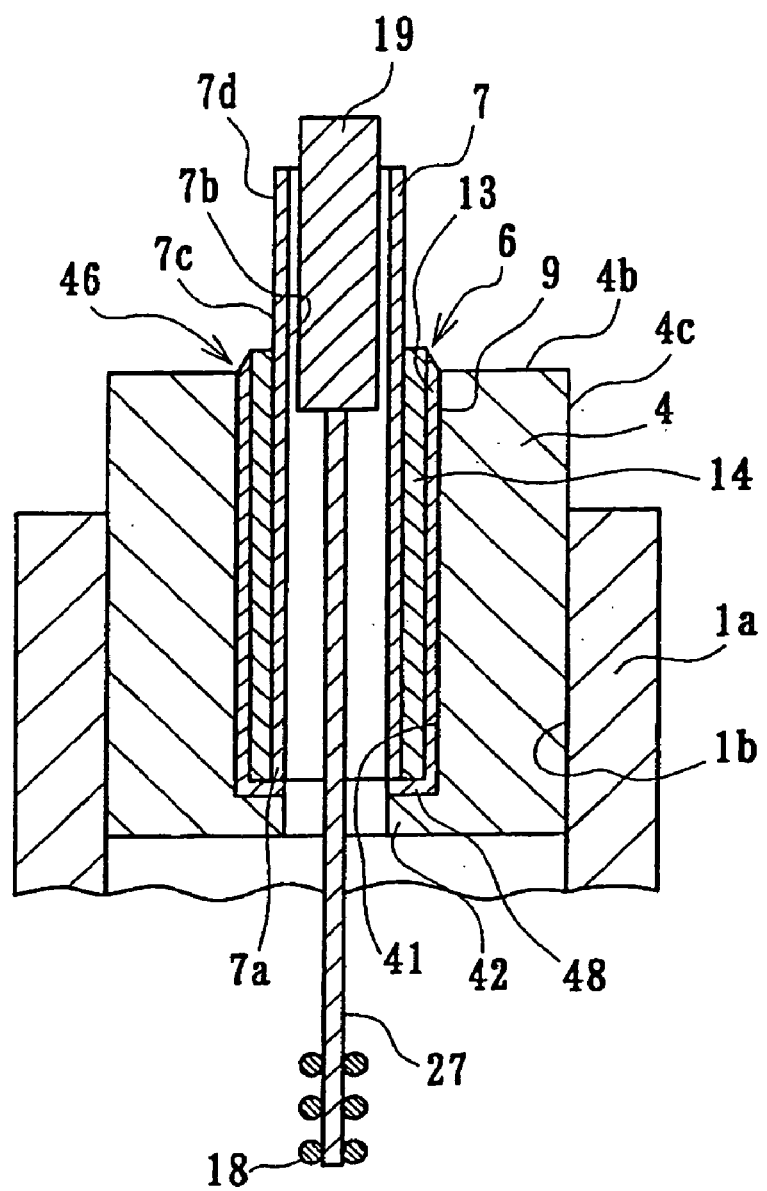
FIG. 6 is a cross sectional view showing a tube-shaped metal member 7 and a sealing member 19 inserted in the metal member 7 of the lamp of FIG. 2.
Figure 7:
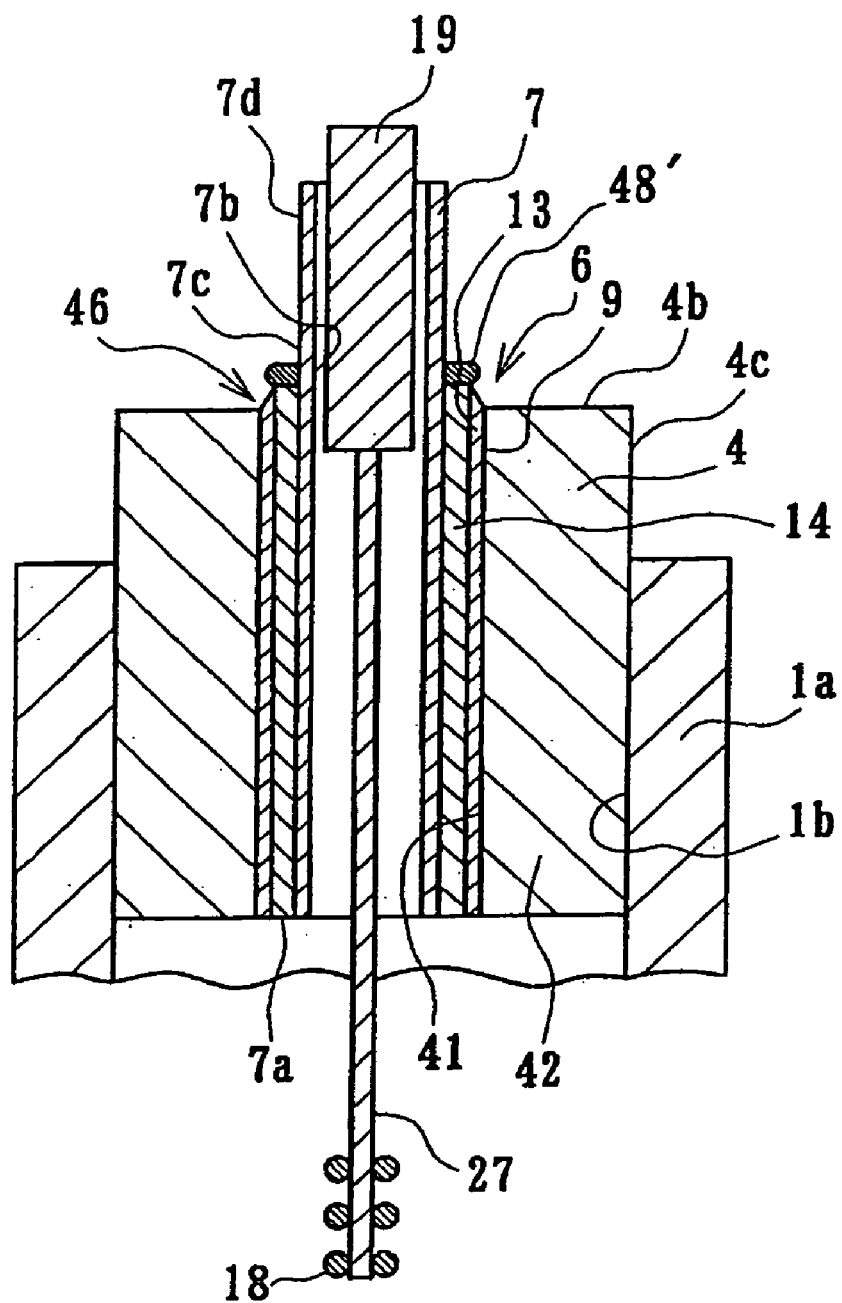
FIG. 7 is a cross sectional view showing a tube-shaped metal member 7 and a sealing member 19 inserted in the metal member 7 of the lamp of FIG. 2, according to another embodiment.
Figure 8:
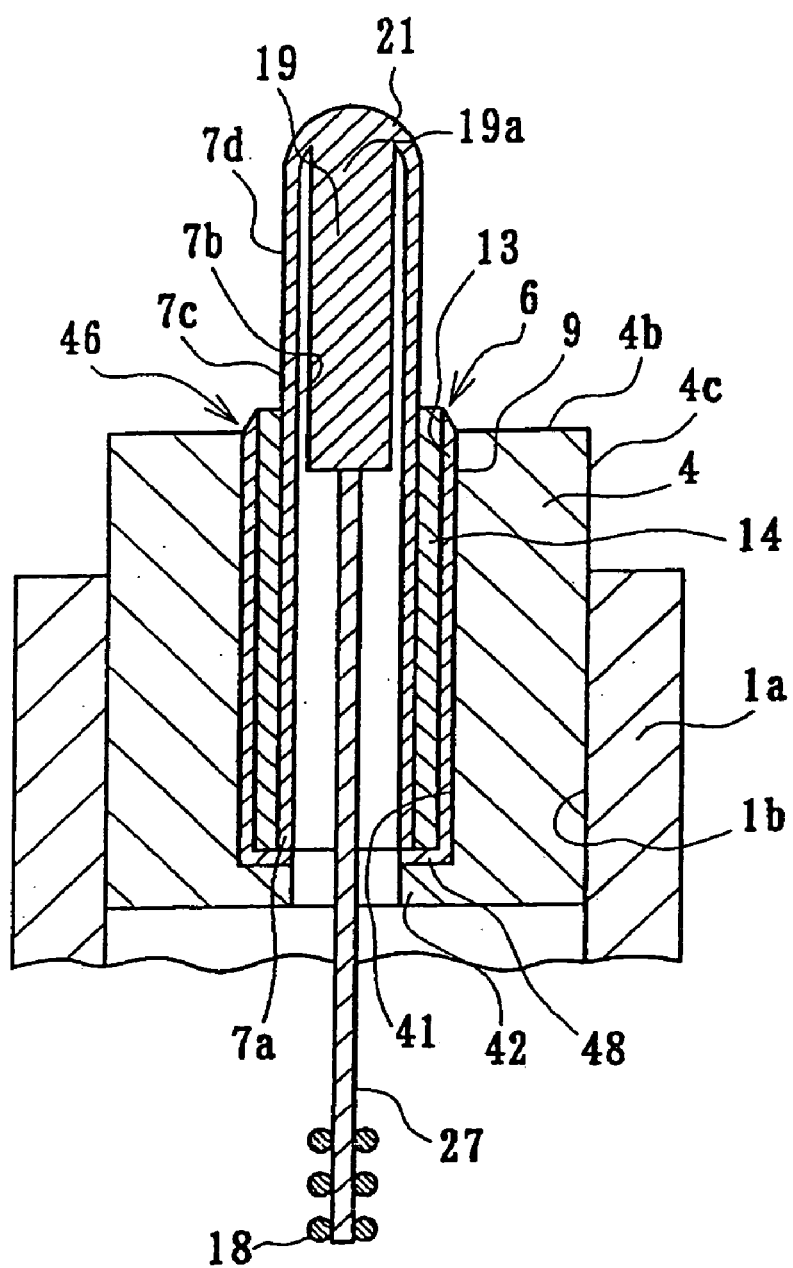
FIG. 8 is a cross sectional view showing a high pressure discharge lamp after the metal member 7 and a sealing member 19 are joined to form a sealing portion 21.

As shown in FIG. 6, an axis 27 of an electrode system 18 is attached to a sealing member 19 (preferably made of a metal), and the electrode system 18 is inserted into the inner space of a ceramic discharge vessel. The sealing member 19 is inserted into the inner space of the metal member 7. As shown in FIG. 7, it is possible to expose a metal end 7a to the inner space of the discharge vessel and provide a stopper 48'. As shown in FIG. 8, an end portion 19a of the sealing member 19 is joined by means of the above welding or the like to the metal member 7 so that a sealing portion 21 is formed. It is thereby possible to seal an ionizable light-emitting substance and starter gas in the inner space of the discharge vessel from the outer atmosphere and to provide an electric power to the electrode system 18 through the sealing member 19. A protrusion 42 functions to position the metal member 7 and to make flow path of the corrosive gas longer.

Figure 9:
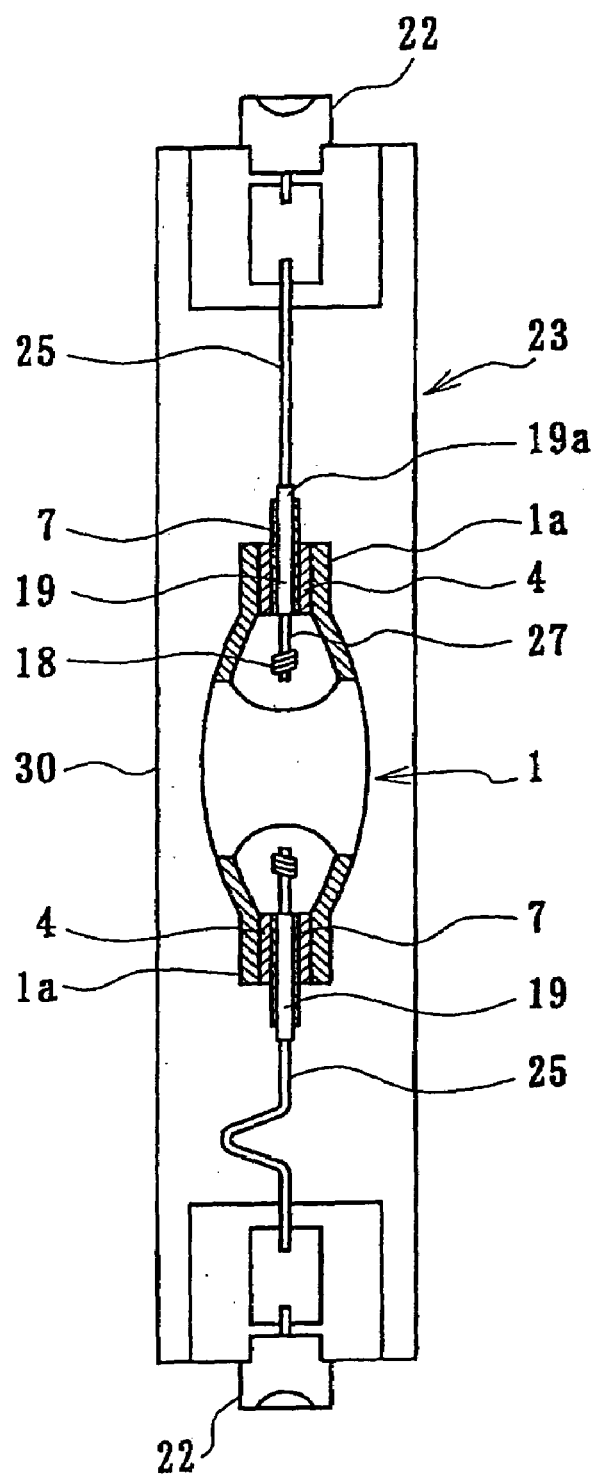
FIG. 9 is a diagram schematically showing an example of a high pressure discharge lamp.

FIG. 9 is a diagram schematically showing an embodiment of a high pressure discharge lamp. A high pressure discharge lamp system 23 has an outer tube 30 generally made of a hard glass, in which a high pressure discharge lamp 1 is contained. The outer tube 30 has both ends sealed with ceramic caps 22. Each sealing member 19 is inserted into and joined with each metal member 7. An outer lead wire 25 is connected with each outer end 19a of each sealing member 19.

Figure 10:
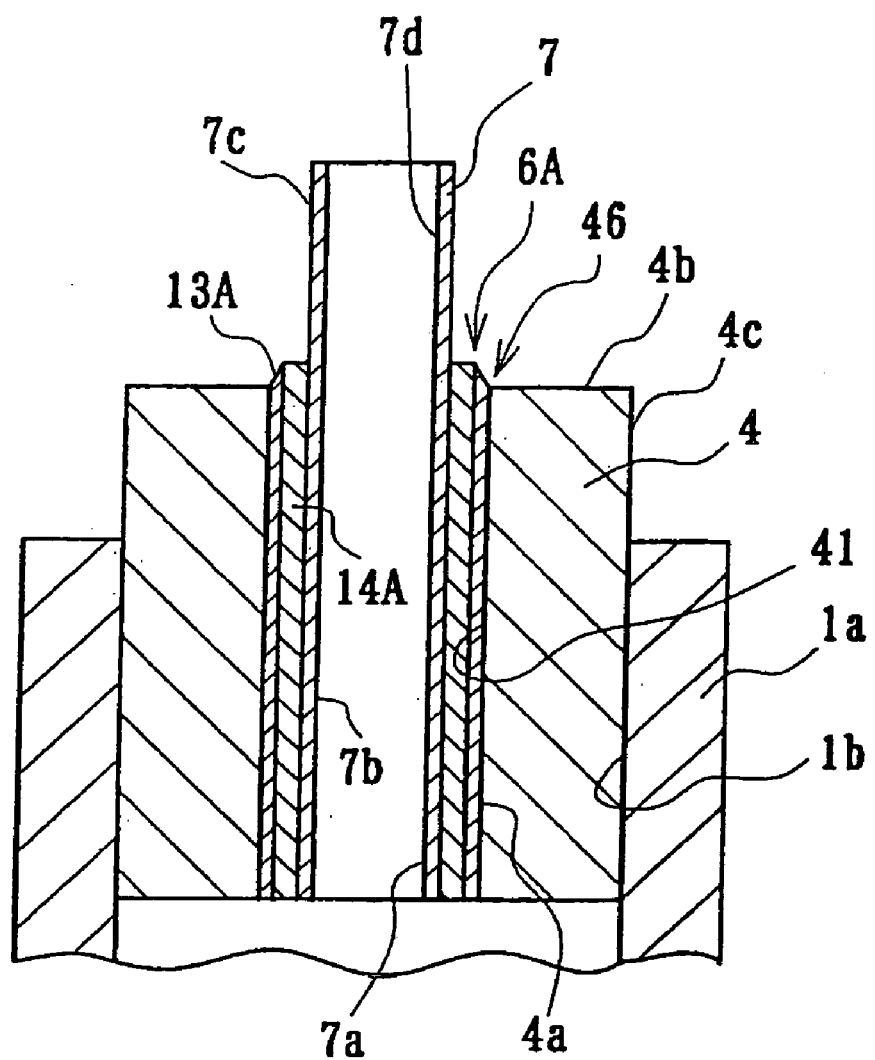
FIG. 10 is a cross sectional view schematically showing an embodiment of an end portion of a high pressure discharge lamp according to the invention, wherein a metal member 7 is joined to the inner wall surface of a sealing member 4 substantially along the full length of the wall.

In the embodiment shown in FIG. 10, the sealing member 4 has no protrusion on its inner wall surface. The metal member 7 and the inner wall surface 4a of the sealing member 4 are joined substantially along the fall length of the through hole 46 of the member 4. 6A represents a joining material 13A an intermediate glass layer and 14A joining material.

Figure 11:
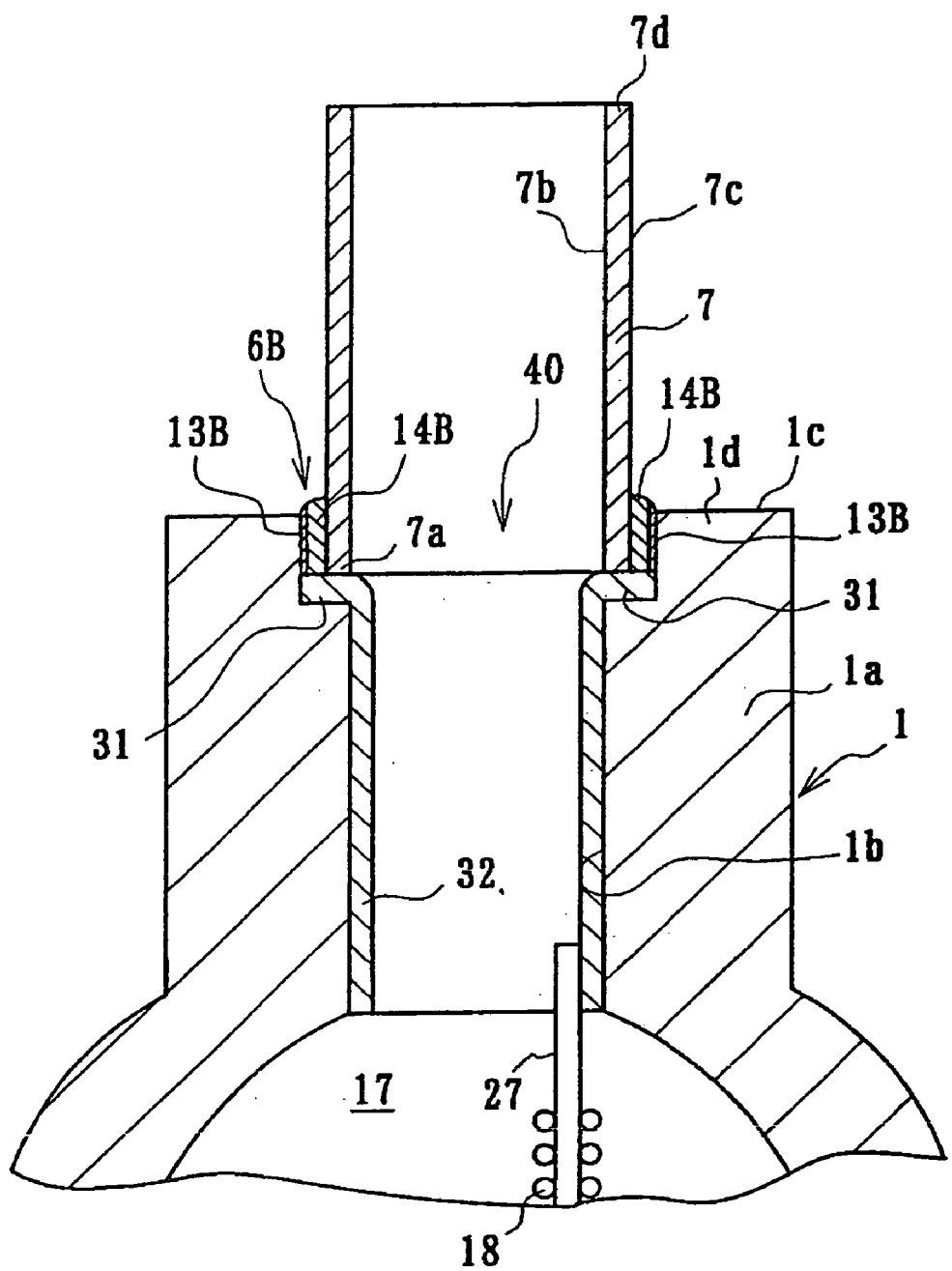

In the embodiment shown in FIG. 11, the inner wall surface 1b of the end portion 1a of the discharge vessel 1 extends straightforwardly in the direction of the main axis of the vessel 1. A hollow 31 is formed in the end portion 1d of the inner wall surface 1b of the end portion 1a. An end portion 7a of a metal member 7 is supported in the hollow 31. A joining portion 6B is interposed between the discharge vessel 1 and the metal member 7 to join them with each other in the hollow 31 to secure the air-tightness. 32 represents a metallized layer.

Figure 12:
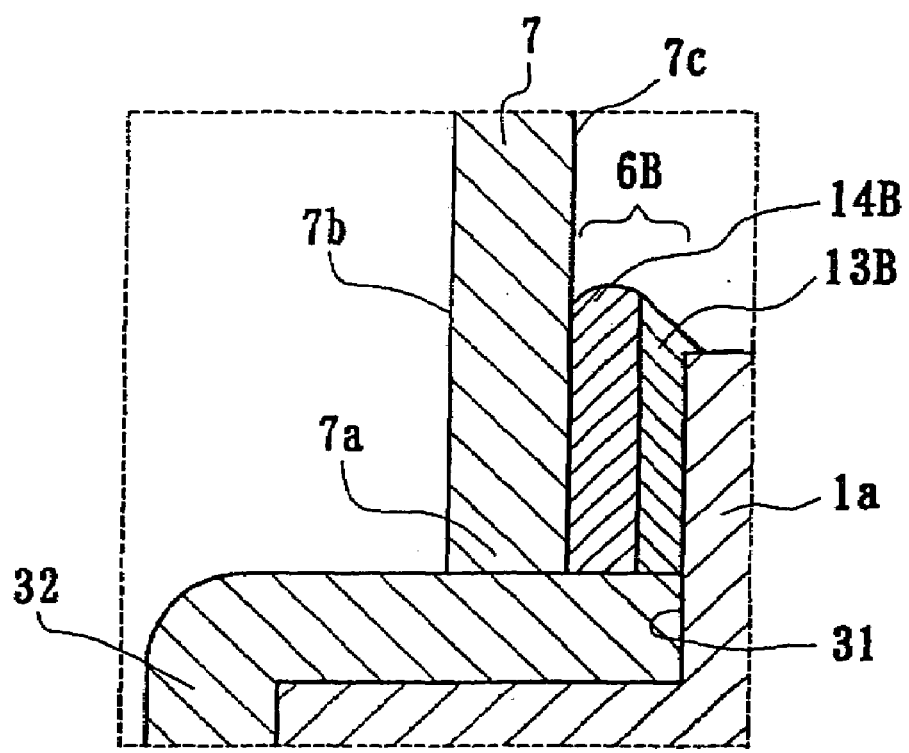
FIG. 12 is an enlarged view showing the region near a hollow 31 shown in FIG. 11.

FIG. 12 is an enlarged view of the region near the hollow 31 shown in FIG. 11. The joining portion 6B has joining material 14B contacting the metal member 7 and an intermediate layer 13B contacting the discharge vessel 1. The metallized layer 32 covers the inner wall surface 1b of the end portion 1a of the discharge vessel 1. The layer 32 further covers the surface of the hollow 31, contacts the edge of the end portion 7a of the metal member 7 and extends to the edge of the joining portion 6B.

Figure 13:
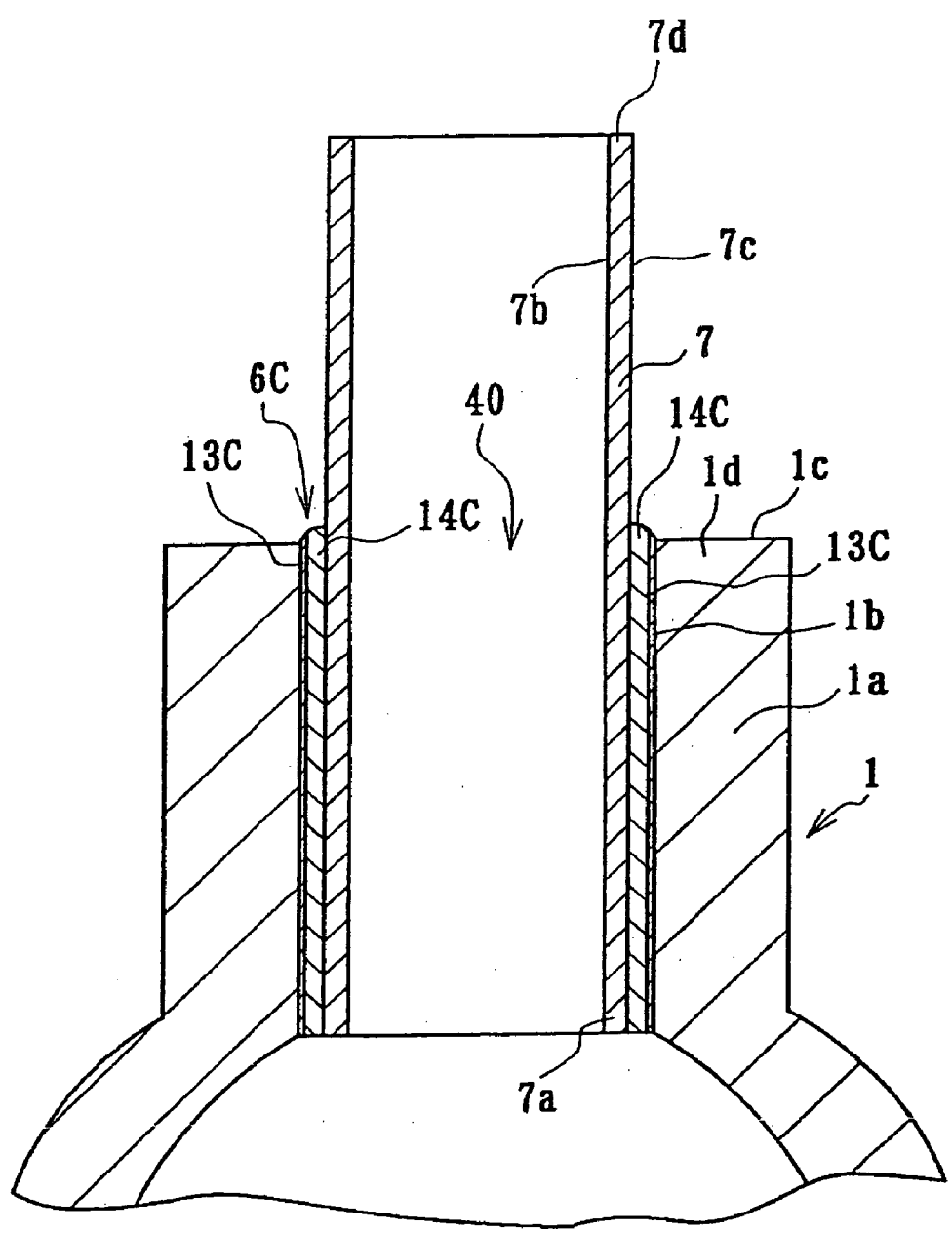
FIG. 13 is a cross sectional view schematically showing an end portion of the lamp according to another embodiment, wherein a metal member 7 is joined with an inner wall surface of the end portion 1a of a discharge vessel 1 substantially along the full length of the surface.

The embodiment of FIG. 13 have no protrusion on the inner wall surface 1b of the end portion 1a of the discharge vessel 1 and the inner wall surface 1b extends substantially straightforwardly. The inner wall surface 1b of the end portion 1a and the metal member 7 are joined with each other substantially along the fall length of an opening 40 of the end portion 1a. 6C represents a joining material, 13C an intermediate layer and 14C a joining material.

Figure 14:
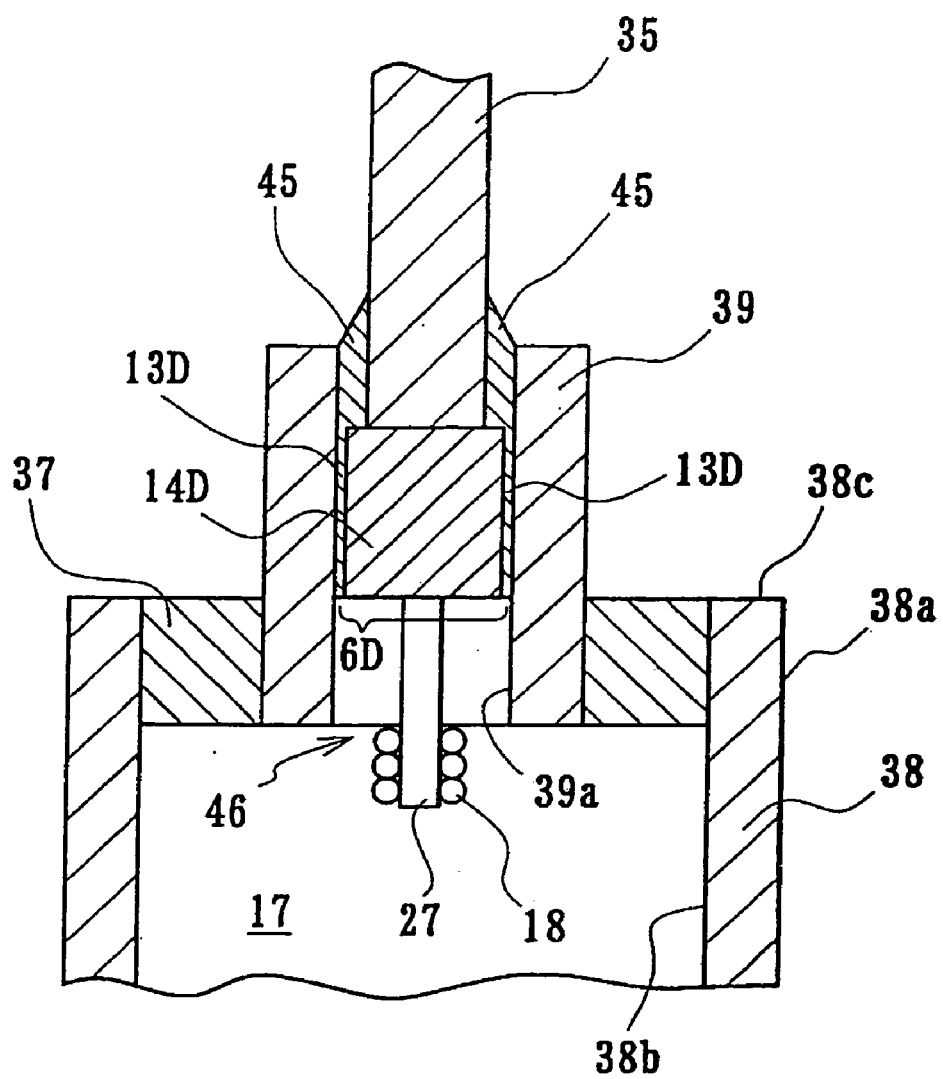
FIG. 14 is a cross sectional view schematically showing an end portion of the lamp according to another embodiment, wherein a through hole 46 of a sealing member 39 is sealed by a joining material 6D of the invention.
Figure 15:
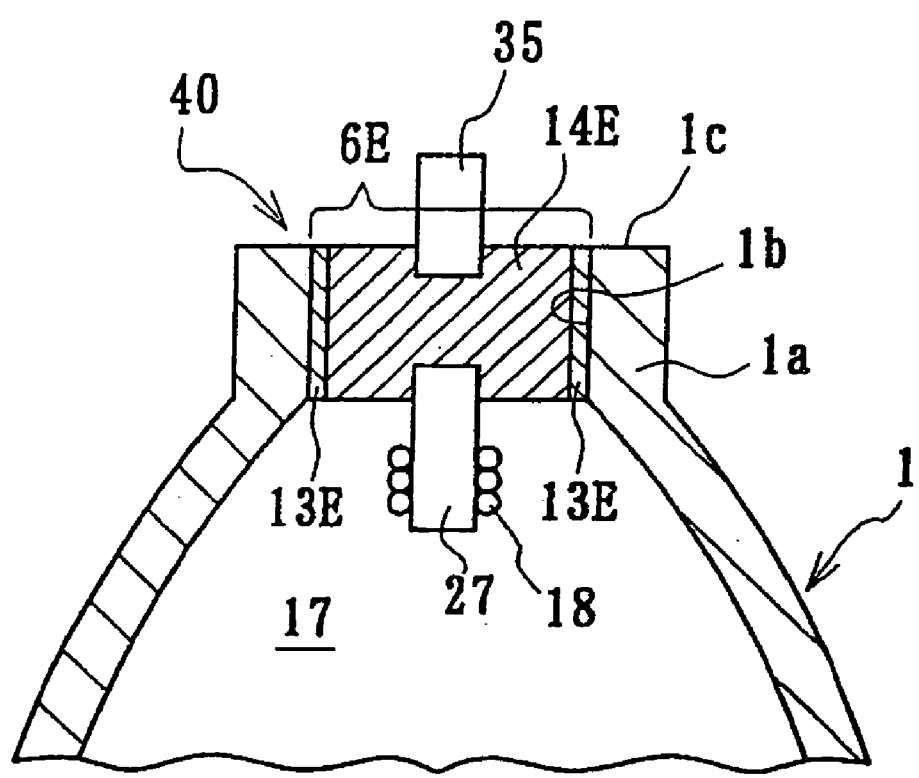
FIG. 15 is a cross sectional view schematically showing an end portion of the lamp according to another embodiment of the invention, wherein an opening 40 of an end portion 1a of the discharge vessel 1 is sealed with a joining material 6E of the invention.

In each embodiment described above, the inventive joining material is provided between the outer surface of the metal member and the inner wall surface of the end portion of the discharge vessel or the sealing member. In other words, the above inventive joining materials do not seal the opening in the end portion of the discharge vessel or through hole of the sealing member by itself. However, the inventive joining material has excellent resistance against corrosion. It is thus possible to seal the opening of the discharge vessel by itself to preserve the air-tightness, by contacting the intermediate layer with the inner wall surface facing the opening and by sealing it with the intermediate layer and the joining material. Alternatively, the intermediate layer may be contacted with the inner wall surface facing the through hole of the sealing member to seal the through hole by the intermediate layer and joining material with preserved air-tightness. In these cases, the metal member is joined with the joining material without passing through the joining material. FIGS. 14 and 15 relate to such embodiments.

In the embodiment of FIG. 14, a first sealing member 37 is inserted in an inner surface 38b near an end face 38c of the discharge vessel 38 of a high pressure discharge lamp. An outer surface 38a of the discharge vessel 38 extends straightforwardly in its longitudinal direction. The thickness of the discharge vessel 38 is substantially uniform. A second cylindrical sealing member 39 is inserted in the interior of the first sealing member 37. The sealing members 37 and 39 are made of a ceramic or cermet, same as the sealing members described above. The inventive joining portion 6D is formed within the second sealing member 39.

When the joining portion 6D is formed, a porous bone structure is inserted within the sealing member 39. Preferably, a metal member 35 and a metal axis 27 made of molybdenum is joined to the bone structure in advance. When the outer diameter of the structure and the inner diameter of the inner wall surface 39a of the sealing member 89 are strictly adjusted to the same value, it might be impossible to insert the bone structure due to the dimension clearance. Preferably, a clearance of 0.05 to 0.10 mm is provided. When inserting the bone structure and melting a glass composition on the bone structure, the molten composition is impregnated into the bone structure to form joining material 14D and an intermediate layer 13D is formed in the clearance of the bone structure and sealing member 39.

Consequently, the through hole 46 of the sealing member 39 is substantially sealed by the joining material 14D and the intermediate layer 13D is formed in the clearance between the joining material 14D and the inner wall surface 39a of the sealing member 39. The axis 27 is joined onto the surface, facing the inner space 17, of the joining material 14D and a metal member 35 is joined to the outer surface of the joining material 14D. A glass composition layer 45 is further formed within the clearance between the metal member 35 and sealing member 39.

In the embodiment shown in FIG. 15, as shown in FIG. 14, the inventive joining portion 6E is formed within an opening 40 of the end portion 1a of the discharge vessel 1.

When the joining portion 6E is formed, a porous bone structure is inserted into the inner opening 40 of the end portion 1a of the discharge vessel 1. A metal member 85 and a metal axis 27 are joined to the bone structure in advance. A clearance, preferably of 0.05 to 0.10 mm, is provided between the outer surface of the bone structure and the inner surface 1b of the discharge vessel 1. When inserting the bone structure and melting the glass composition on the structure, the molten composition is impregnated into the bone structure to form joining material 14E. An intermediate layer 13E is formed in the clearance between the joining material 14E and the discharge vessel 1 at the same time.

The relationship among the clearance between the outer surface of the bone structure and the inner surface of the discharge vessel, easiness of insertion of the electrode system, and easiness of the impregnation of glass composition into the bone structure is shown below.

TABLE 1

| Evaluation items Clearance (μm) | easiness of insertion | Easiness of impregnation of glass composition |
|---|---|---|
| 30 | Reasonable | Excellent |
| 50 | Good | Excellent |
| 80 | Excellent | Excellent |
| 100 | Excellent | Good |
| 120 | Excellent | Reasonable |

If the clearance is not larger than 0.03 mm, the outer surface of the bone structure makes contact with the inner surface of the vessel and thus the bone structure may be damaged when the electrode system inclines to the direction of insertion. On the other hand, if the clearance is 0.12 mm, the ceramic composition might not be filled into the bone structure and thus the composition might flow downwardly.

According to the high pressure discharge lamp of the present invention, the discharge lamp and metal member, or the sealing and metal members are joined using an oxynitride glass described above. In this embodiment, although the oxynitride glass may be impregnated into the porous bone structure as described above, such bone structure is not indispensable. For example, the discharge vessel and metal member or sealing member are joined with a joining material substantially composed of an oxynitride glass. Alternatively, an oxynitride glass and the other glass, metallizing material or cermet may be used to from the joining layer.

Figure 16:
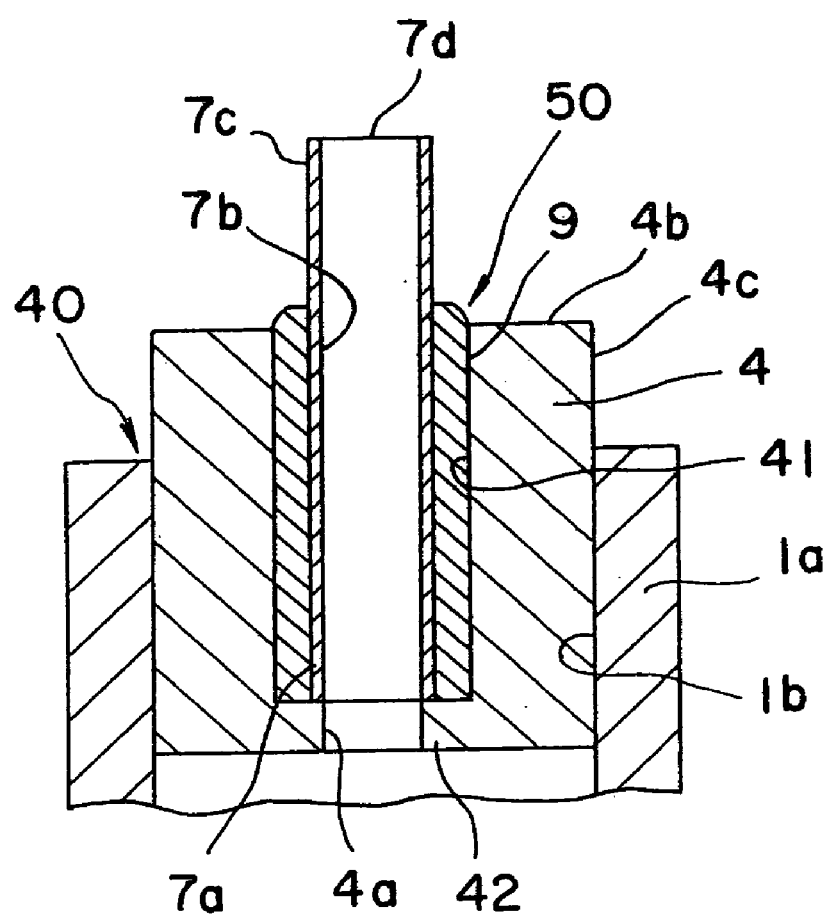
FIG. 16 is a cross sectional view showing a joining layer 50 made of an oxynitride glass generated between the metal member 7 and sealing member 4.
Figure 17:
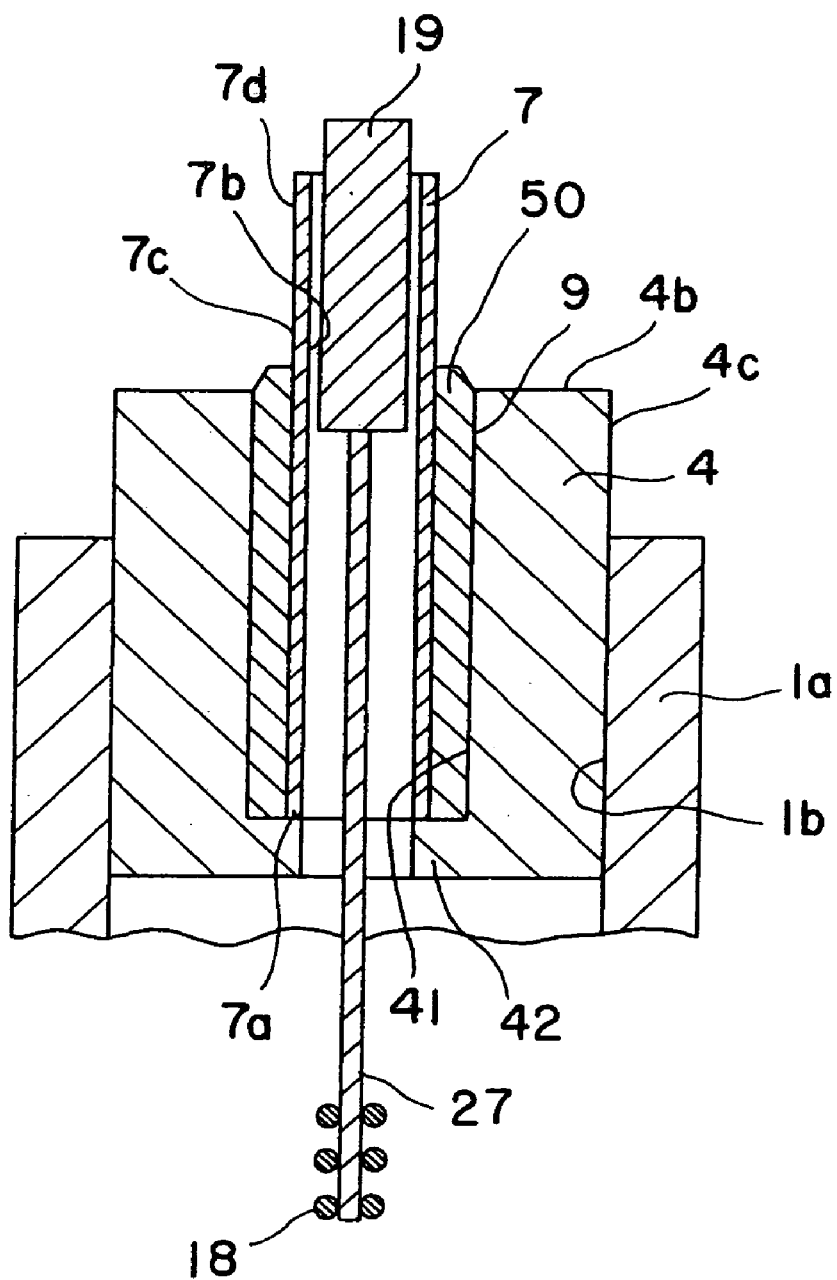
FIG. 17 is a cross sectional view showing a sealing member 19 inserted into the metal member 7 of FIG. 16.
Figure 18:
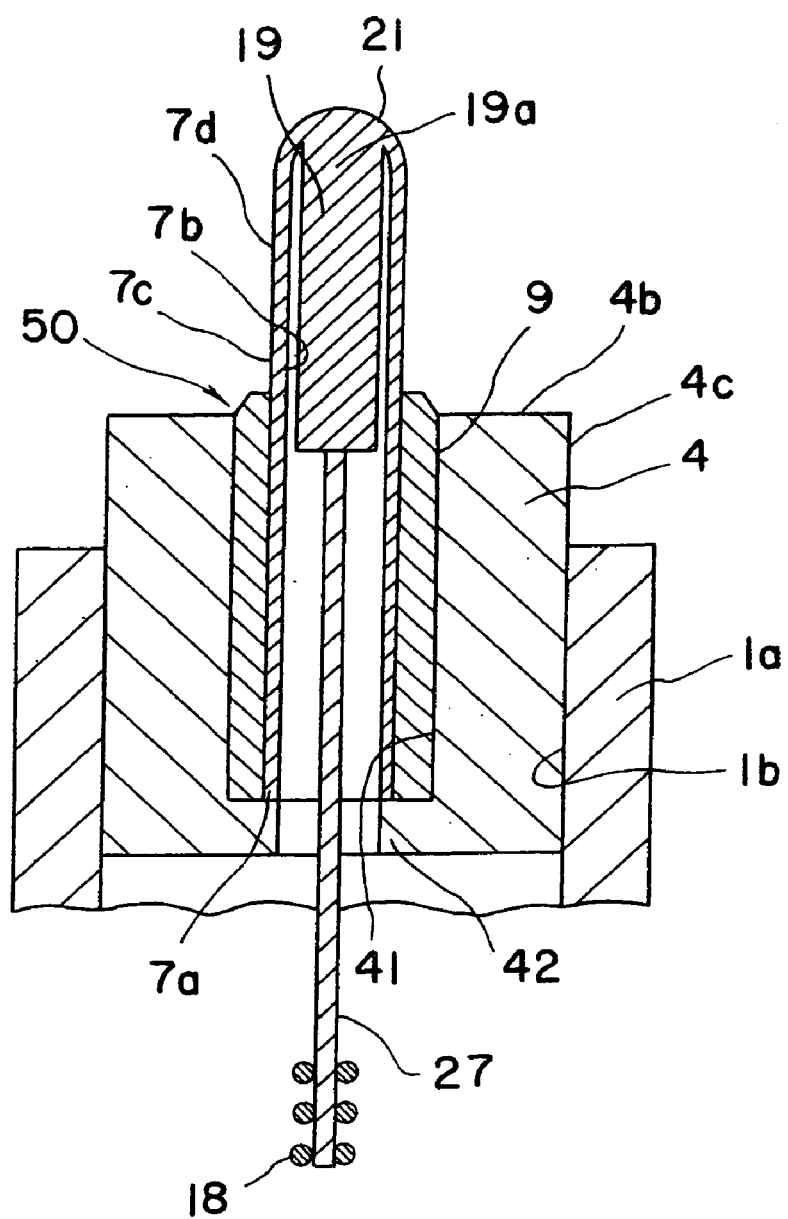
FIG. 18 is a cross sectional view showing a high pressure discharge lamp having a sealing portion 21 produced by joining the metal member 7 and sealing member 19 of FIG. 16.

FIGS. 16 to 18 show an end portion of a high pressure discharge lamp according to this embodiment of the present invention. In FIG. 16, a pipe-shaped metal member 7 and sealing member 4 are joined with an oxynitride glass 50. A predetermined gas is then supplied into the inner space of the discharge vessel 1. Next, as shown in FIG. 17, a sealing member 19 is inserted inside of the metal member 7. As shown in FIG. 18, the sealing member 19 is then welded to the inner surface of the metal member 7 to seal the metal member 7. Such welding process itself is described referring to FIGS. 6 to 8.

The metal member 7 may be joined with the sealing member or discharge vessel with an oxynitride glass, according to the following procedure. That is, a raw material (composition) for the oxynitride glass is set between the metal member and the discharge vessel or sealing member, or on the end portion of the sealing member in the vessel. The composition is then molten to flow into the gap. The oxynitride glass is then cooled to generate the joining layer.

In the field of a high pressure discharge vessel, it is novel to use an oxynitride glass as a joining agent for joining the metal member with the sealing member or discharge vessel. It is possible to utilize the above properties of the oxynitride glass to successfully obtain a high pressure discharge lamp having improved resistance.

Although it is not clear why an oxynitride glass has not been used in the field, the followings might be speculated. Molten oxynitride glass has a basically large viscosity so that foaming may be easily induced. It is thus difficult to complete the sealing step using such glass in a short time period. It may be thus difficult to apply such glass for an application of sealing in the field of handling light-emitting and volatile substances such as a high pressure discharge lamp.

For example, in a high pressure discharge lamp described in Japanese patent 3155651, a discharge vessel is sealed using a frit glass after a light-emitting substance is supplied into the vessel It is thus necessary to heat the frit glass at a temperature as high as 1450 to 1600° C. and to complete the sealing process in a relatively short time (for example about 10 minutes), otherwise the light-emitting substance may volatile during the heating process. An oxynitride glass has a high viscosity so that foaming may be easily induced. The oxynitride glass becomes more susceptible to foaming under a reduced pressure. It is impossible to complete the sealing procedure in such a short time period under a reduced pressure and to seal the light-emitting substance with the oxynitride glass. An oxynitride glass has a high viscosity and tends to foam easily so that it is difficult to complete the sealing procedure in a short time and under a reduced pressure. In the sealing process of a high pressure discharge lamp using a conventional glass frit, the oxynitride glass with the above difficulties seems to be inappropriate at a first glance. It might be a reason that the oxynitride glass has not been studied as a joining agent in the field.

On the contrary, after the pipe-shaped metal member 7, for example shown in FIG. 3, is joined with one end of a high pressure discharge lamp (see FIG. 9), the light-emitting substance and a starter gas may be introduced through the opening 7b of the metal member 7 and sealed. Thereafter, the opening of the metal member 7 is sealed as shown in FIGS. 6 to 8, so that the light-emitting substance may be sealed in the light-emitting vessel. For example, when the light-emitting substance is introduced into the inner space of the light emitting vessel after the metal member is joined and fixed to the end portion of the vessel, the light-emitting substance is not present in the stage of joining the metal member 7 with the end portion of the vessel. It is thus possible to perform the joining procedure under a normal pressure over a relatively long time. As a result, the oxynitride glass having a high viscosity and tendency to foaming may be used for completing the joining procedure.

In a preferred embodiment, a passage for passing and introducing the light emitting substance is provided in at least one of the two metal members to be joined with the two end portions of the light-emitting vessel. More preferably, the metal member has a shape of a cylinder or pipe. The high pressure discharge lamp of the present invention is not limited to such embodiment. For example, the light-emitting substance may be introduced into the vessel through a passage other than the both ends portion of the vessel, after the both end portions are sealed. In this case, it is not necessary to form a passage for the light-emitting substance in the two metal members to be fitted to the both end portions of the vessel. Such metal member without the passage may be joined to the end portion using an oxynitride glass. It is further possible to adjust the material (composition) of the oxynitride glass, the content of the light-emitting substance and working conditions to seal the metal member to the end portion of the vessel while preventing the foaming of the glass.

Next, the most preferred process for producing high pressure discharge lamps according to embodiments of the invention will be described. When a sealing member is used, powdery raw material (preferably alumina powder) is shaped into a shaped body with a shape, for example of a ring, of the sealing member. At this stage, it is preferred to press-mold granules, granulated with a spray drier or the like, under a pressure of 2000 to 3000 kgf/cm$^2$. The resulting shaped body may preferably be subjected to dewaxing and calcination to obtain a calcined body, which is then finish-sintered at a temperature between 1600 to 1900° C. under reducing atmosphere of a dew point of −15 to 15° C.

The dewaxing process may preferably be carried out at a temperature of 600 to 800° C. and the calcination process may preferably be carried out at a temperature of 1200 to 1400° C. The calcination may provide a some degree of strength to the shaped body of the sealing member and prevent the deficiency of leveling of paste due to absorption of a solvent when a material for metallizing is contacted with the sealing member. The calcination may further facilitate the handling of the sealing member. A hollow may be formed, for example, by machining.

Metal powder is formulated, crashed, dried, and milled with an added binder such as ethyl cellulose, acrylic resin or the like, to obtain paste, which is then applied onto the outer surface of the end portion of the metal member and dried at a temperature of 20 to 60° C. The resulting calcined body is sintered under reducing or inert atmosphere or vacuum of a dew point of 20 to 50° C. at a temperature of 1200 to 1700° C.

Also, a main body of a ceramic discharge vessel is shaped, dewaxed and calcined to obtain a calcined body of the discharge vessel. A pre-sintered body of the sealing member is inserted into the end portion of the resulting calcined body, set at a predetermined position and finish-sintered under reducing atmosphere of a dew point of −15 to 15° C. at a temperature of 1600 to 1900° C. to obtain a ceramic discharge vessel.

Also, powder or frit is pre-formulated to a predetermined glass composition according to the invention, crashed, granulated with an added binder such as polyvinyl alcohol or the like, press-molded and dewaxed to obtain molded body. Alternatively, powder or frit for a glass is molten and solidified to obtain solid, which is then crashed, granulated with added binder, press-molded and dewaxed to obtain a molded body. In this case, it is preferred to add 3 to 5 weight percent of a binder to the powder, to press-mold at a pressure of 1 to 5 ton, and to dewax.

Such discharge vessel, sealing and metal members, porous bone structure and molded body are assembled as shown in FIG. 1 and heated at a temperature of 1000 to 1600° C. under dry and non-oxidizing atmosphere.

The content of a binder in the molded body may be also reduced to a value not higher than 15 weight percent. It is thus possible to assemble the molded body on the discharge vessel, sealing and metal members and bone structure without the dewaxing process of the molded body in atmosphere. The thus obtained assembly may be heated at a temperature between 1000 to 1600° C. under dry and non-oxidizing atmosphere.

Further, paste of the glass composition 20' may be applied on and around the metal member 7, bone structure 2 and sealing member 4, as shown in FIG. 3. In this case, the glass composition is formulated, crushed, dried and kneaded with ethyl cellulose or an acrylic resin or the like to produce paste. The paste is then applied on a predetermined position and sintered at a temperature of 1600 to 1900° C. under non-oxidizing and dry atmosphere. It is thus possible to eliminate the necessity of the dewaxing of the glass composition for obtaining the molded body.

When a sealing member is not used in a high pressure discharge lamp, a main body of a ceramic discharge vessel is shaped to obtain a shaped body, which is then dewaxed, calcined and finish-sintered. Also, paste of metal powder is produced as described above, applied or printed onto the surface of a metal member and subjected to heat treatment to form a porous bone structure. After the discharge vessel and metal member are assembled and the above described glass material is set, they are heat-treated as described above to obtain a high pressure discharge lamp.

Further, in the above description of the preferred production process, the metal member may be joined directly with the discharge vessel or sealing member using the oxynitride glass, without using the porous bone structure.

EXAMPLES (Experiment I')

(Production of a High Pressure Discharge Lamp)

The ceramic discharge lamp as described above referring to FIGS. 1 to 5 was produced according to the above process. The ceramic discharge vessel and sealing member were made of alumina ceramics, and a pipe made of molybdenum is used as the metal member. Molybdenum powder with an average particle diameter of 3 μm was used for the porous bone structure, and ethyl cellulose was used as a binder. The molybdenum powder had a tap density of 2.9 g/cc.

Powders of dysprosium oxide, aluminum oxide, silicon oxide and silicon nitride are mixed to produce a mixture. The mixture was shaped to obtain a ring-shaped body which is then dewaxed at 700° C. in atmosphere. The thus obtained ring-shaped body was then set as shown in FIG. 1 and heated at 1700° C. under dry and non-oxidizing atmosphere so that the mixture was molten and impregnated into the pores of the bone structure and cooled.

The thus obtained ceramic discharge vessel was subjected to a test "A" (continuous lightening test) and test "B" (thermal cycle test) described below. Further in the present example, the microstructure near the joining interface of the metal member 7 and sealing member 4 was observed with a scanning electron microscope and the results were shown in FIG. 4.

The content of each element (at. %) was obtained by the following procedure. About 1 to 5 grams of the raw mixture (composition) was molten according to the same conditions as described above and analyzed by means of high frequency plasma analysis or the like.

TABLE 2

| Composition of Mixture | Dy at % | Al at % | Si at % | O at % | N at % |
|---|---|---|---|---|---|
| 1 | 4 | 36 | 3 | 45 | 12 |
| 2 | 4 | 34 | 5 | 45 | 12 |
| 3 | 3 | 30 | 7 | 48 | 12 |
| 4 | 3 | 29 | 9 | 57 | 2 |
| 5 | 3 | 29 | 9 | 55 | 4 |
| 6 | 3 | 28 | 9 | 52 | 8 |
| 7 | 3 | 28 | 9 | 48 | 12 |
| 8 | 3 | 28 | 9 | 40 | 20 |
| 9 | 3 | 25 | 12 | 40 | 20 |
| 10 | 3 | 22 | 15 | 40 | 20 |
| 11 | 3 | 19 | 18 | 40 | 20 |

(Test "A"; Continuous Lightening Test)

1000° C. is a temperature at the end portion normally utilized in a high pressure discharge lamp and 1100 and 1050° C. are overloaded temperatures. The discharge lamp was lightened continuously over 2000 hours. The resistance against the latter means that the discharge vessel may safely preserve a starter gas and an ionizable light-emitting substance therein for a longer period of time, even when the gas and substance are introduced into the discharge vessel under a pressure higher than a normal value.

After terminating the lightening, the presence and absence of gas leakage from the light-emitting vessel using Tesla coil. The results were shown in table 3. In table 3, "○" means the absence of the leakage after the continuous lightening at 1100° C. and "Δ" means the absence of the leakage after the continuous lightening at 1050° C.

(Test "B": Thermal Cycle Test)

Specifically, in one cycle, its temperature was maintained at room temperature for 5 minutes, elevated to 1100 or 1150° C., maintained at 1100 or 1150° C. for 5 minutes and decreased to room temperature. 2000 thermal cycles were performed. After that, the presence and absence of gas leakage was measured using Tesla coil. The results were shown in table 3. In table 3, "○" means the absence of the leakage after the thermal cycles of room temperature—1150° C. and "Δ" means the absence of the leakage after the thermal cycles of room temperature—1100° C.

TABLE 3

| Composition Of Mixture | Test A Continuos lightening Test over 2000 hours | Test B Thermal cycle Test | Evaluation |
|---|---|---|---|
| 1 | ○ | Δ | Δ |
| 2 | ○ | Δ | Δ |
| 3 | ○ | ○ | ○ |
| 4 | Δ | ○ | Δ |
| 5 | ○ | ○ | ○ |
| 6 | ○ | ○ | ○ |
| 7 | ○ | ○ | ○ |
| 8 | ○ | ○ | ○ |
| 9 | ○ | ○ | ○ |
| 10 | ○ | ○ | ○ |
| 11 | Δ | ○ | Δ |

A polycrystalline material was generated in the composition numbers 1 and 2. An oxynitride glass was generated in each of the composition numbers 3 to 11.

In the composition numbers 3 to 11, gas leakage was not observed after the thermal cycles between room temperature and 1150° C. The results of the thermal cycle test were superior to those in the composition numbers 1 and 2. The results of the thermal cycle test were still further improved when the content of nitrogen atoms is not lower than 4 at. %. The results of the continuous lightening teas were further improved when the content of silicon is 7 to 15 at. %.

(Experiment II)

A mixture of powdery materials of dysprosium oxide, alumina, silicon oxide and silicon nitride was obtained. The composition (weight percent) of dysprosium oxide, alumina, silicon oxide and silicon nitride was 69:9:8:14. The mixture was mounted on an alumina plate, heated at 1700° C. and cooled to produce a bulk of glass. A weight made of alumina was mounted on the bulk of glass and heated at an appropriate temperature for 1 hour. After cooling, the deformation of the glass by the weight was compared with that of a standard glass to calculate a relative softening point.

The composition of the standard glass was 80 weight percent of dysprosium oxide, 10 weight percent of alumina and 10 weight percent of silicon oxide. The softening point of the standard glass was 880° C. As the relative softening point is higher, it may be deeded that the content of N is larger.

The volume ratio of hydrogen to nitrogen in atmosphere during the above heating and cooling steps, the weight ratio of silica for co-sintering, and the dew point in the atmosphere was changed as shown in tables 4 and 5. The presence of vitrifaction, presence of foaming, relative softening point, degree of blackening, and degree of whitish turbidity were measured for each of the obtained glasses. The presence of vitrifaction and foaming was confirmed by visual evaluation of the glass obtained by the melting and cooling steps. The blackening and whitish turbidity were confirmed by visual evaluation of a YAG sample set near the alumina plate. The results of the evaluation were indicated as follows.

"◎" Excellent:   "○" Superior
"Δ" Reasonable:  "X" Inferior

When the result was "Δ" or "x ", the test for measuring softening point was not performed.

TABLE 4

| No. | H2:N2 | Weight ratio Of silica | Dew point (° C.) | Vitrifaction | Foaming | Relative Softening point (° C.) | Blackening | Whitish Turbidity |
|---|---|---|---|---|---|---|---|---|
| 1 | 10:90 | 1.70 | dry | X | △ | — | ○ | X |
| 2 | 20:80 | 1.70 | dry | △ | ○ | — | △ | X |
| 3 | 25:75 | 1.70 | dry | ○ | ○ | 960 | X | X |
| 4 | 30:70 | 1.70 | dry | ◎ | ◎ | 960 | X | X |
| 5 | 50:50 | 1.70 | dry | ◎ | ○ | 930 | X | X |
| 6 | 60:40 | 1.70 | dry | ◎ | △ | 880 | X | X |
| 7 | 30:70 | 1.50 | dry | ◎ | ◎ | 960 | X | X |
| 8 | 30:70 | 1.00 | dry | ◎ | ◎ | 960 | X | X |
| 9 | 30:70 | 0.50 | dry | ◎ | ○ | 960 | X | △ |
| 10 | 30:70 | 0.25 | dry | ○ | ○ | 960 | X | ○ |

TABLE 5

| No. | H2:N2 | Weight ratio Of silica | Dew point (° C.) | Vitrifaction | Foaming | Relative softening point (° C.) | Blackening | White Turbidity |
|---|---|---|---|---|---|---|---|---|
| 11 | 30:70 | 0.15 | dry | ○ | ○ | 930 | X | ○ |
| 12 | 30:70 | 0.10 | dry | △ | △ | — | X | ◎ |
| 13 | 30:70 | 0.25 | −8 | ○ | ○ | 960 | △ | ○ |
| 14 | 30:70 | 0.25 | −5 | ○ | ○ | 930 | ○ | ○ |
| 15 | 50:50 | 0.25 | 0 | ○ | ○ | 930 | ○ | ○ |
| 16 | 60:40 | 0.25 | +5 | ○ | ○ | 930 | ○ | ○ |
| 17 | 30:70 | 0.25 | +10 | ○ | ○ | 930 | ○ | ○ |
| 18 | 30:70 | 0.25 | +20 | ○ | ○ | 930 | ○ | ○ |
| 19 | 30:70 | 0.25 | +30 | ○ | ○ | 930 | ○ | ○ |
| 20 | 30:70 | 0.25 | +40 | ○ | △ | 880 | ○ | ○ |

As can be seen from the above results, when the glass composition is thermally treated in an atmosphere having a composition of hydrogen to nitrogen of 25:75 to 50:50, the vitrifaction may be progressed. It is thus possible to improve the relative softening point and to prevent the foaming. Further, when 1 weight part of the composition is thermally treated with 0.15 to 1.50 weight parts of silica, or when the dew point of the atmosphere during the heat treatment is made not lower than −5° C. and not higher than +30° C., the blackening or white turbidity may be prevented. When the material of the discharge vessel or sealing member does not contain a rare earth material, however, the above consideration is not needed.

(Experiment III)
(Production of High Pressure Discharge Lamp)

The ceramic discharge lamp described referring to FIGS. 16 to 18 was produced, according to the above process. The discharge vessel and sealing member were formed of alumina porcelain and the metal member was composed of a molybdenum pipe.

Dysprosium oxide, alumina, silicon oxide and silicon nitride powders were mixed to obtain a mixture, which was then shaped to produce a ring-shaped body. The shaped body was dewaxed at 700° C. in atmosphere. The ratio of mixing was (dysprosium oxide:alumina:silicon oxide:silicon nitride)=(69:9:8:14). The thus obtained ring-shaped body 20 was set as shown in FIG. 1, then treated at 1700° C. in dry and non-oxidizing atmosphere to melt the mixture, and then cooled to generate a joining layer 50 composed of an oxynitride glass. A light emitting substance was then introduced and sealed by welding the sealing member to the metal member 7.

The above test "A" (continuous lightening test) was performed on the thus obtained ceramic discharge vessel. Consequently, leakage was not observed after the continuous lightening at 1050° C. Further, the above thermal cycle test "B" was performed to prove that leakage was not observed after the thermal cycles between room temperature and 1100° C.

As described above, the joined body according to the present invention has a joining material resistive against fatigue and fracture, when the body is subjected to thermal cycles between high and room temperatures and held at a high temperature over a long period of time.

The present invention has been explained referring to the preferred embodiments. The invention is, however, not limited to the illustrated embodiments which are given by way of examples only, and may be carried out in various modes without departing from the scope of the invention.

The invention claimed is:

1. A joined body, comprising:
   a first member;
   a second member; and
   a joining material between said first and second members, said joining material comprising a porous bone structure with open pores formed therein and made of a sintered product of metal powder and impregnated phase impregnated into said open pores of said structure, said impregnated phase comprising an oxynitride glass containing silicon atoms;
   wherein said oxynitride glass comprises silicon atoms in a content of not lower than 7 atomic percent and not higher than 15 atomic percent.

2. The joined body of claim 1, wherein said oxynitride glass is made from raw material including a nitride and one or more oxide selected from the group consisting of a rare earth oxide, $Al_2O_3$, $ZrO_2$, MgO, $SiO_2$ and $B_2O_3$.

3. The joined body of claim 2, wherein said nitride comprises one or more nitride selected from the group consisting of aluminum nitride, boron nitride and silicon nitride.

4. The joined body of claim 2, wherein said rare earth oxide is selected from the group consisting of $Sc_2O_3$, $Y_2O_3$, $La_2O_3$, $Gd_2O_3$, $Dy_2O_3$, $Ho_2O_3$ and $Tm_2O_3$.

5. The joined body of claim 1, wherein said. oxynitride glass comprises nitrogen atoms in a content of not lower than 4 atomic percent.

6. The joined body of claim 1, comprising an intermediate layer between said second member and said joining material.

7. The joined body of claim 6, wherein said joining material contacts said first member and said intermediate layer contacts said second member.

8. The joined body of claim 7, wherein said intermediate layer comprises an oxynitride glass.

9. The joined body of claim 8, wherein said oxynitride glass constituting said intermediate layer is made from raw material including a nitride and one or more oxide selected from the group consisting of a rare earth oxide, $Al_2O_3$, $ZrO_2$, MgO, $SiO_2$ and $B_2O_3$.

10. The joined body of claim 9, wherein said nitride comprises one or more nitride selected from the group consisting of aluminum nitride, boron nitride and silicon nitride.

11. The joined body of claim 8, wherein said rare earth oxide is selected from the group consisting of $Sc_2O_3$, $Y_2O_3$, $La_2O_3$, $Gd_2O_3$, $Dy_2O_3$, $Ho_2O_3$ and $Tm_2O_3$.

12. The joined body of claim 8, wherein said oxynitride glass constituting said intermediate layer comprises silicon atoms in a content of not lower than 7 atomic percent and not higher than 15 atomic percent.

13. The joined body of claim 8, wherein said oxynitride glass constituting said intermediate layer comprises nitrogen atoms in a content of not lower than 4 atomic percent.

14. The joined body of claim 1, wherein said first member is made of a metal and said second member is made of a ceramics or cermet.

15. An assembly for a high pressure discharge lamp, comprising:
a ceramic discharge vessel with an inner space formed therein and end portions, an ionizable light-emitting material and a starter gas to be contained in said inner space, and an opening being formed in said end portion;
an electrode system provided in said inner space; and
said joined body of claim 14, wherein said first member is a metal member, said second member is a sealing member, said metal and sealing members are air-tightly sealed, and said sealing member comprises a through hole formed therein, at least a part of said sealing member being fixed in said opening of said ceramic discharge vessel.

16. An assembly for a high pressure discharge lamp, comprising:
said joined body of claim 14, said first member being a metal member, said second member being a ceramic discharge vessel comprising an inner space formed therein and end portions, an ionizable light-emitting material and a starter gas to be contained in said inner space, and an opening being formed in said end portion; and
an electrode system provided in said inner space, wherein said metal member and said discharge vessel are air-tightly sealed.

17. An assembly for a high pressure discharge lamp comprising:
a ceramic discharge vessel with an inner space formed therein and end portions, an ionizable light-emitting material and a starter gas to be contained in said inner space, and an opening being formed in said end portion;
a sealing member comprising a through hole formed therein, at least a part of said sealing member being fixed in said opening of said ceramic discharge vessel;
an electrode system provided in said inner space;
a metal member; and
a joining material for joining said metal member and said sealing member, said joining material comprising at least an oxynitride glass containing silicon atoms;
wherein said oxynitride glass comprises silicon atoms in a content of not lower than 7 atomic percent and not higher than 15 atomic percent.

18. An assembly for a high pressure discharge lamp comprising:
a ceramic discharge vessel with an inner space formed therein and end portions, an ionizable light-emitting material and a starter gas to be contained in said inner space, and an opening being formed in said end portion;
an electrode system provided in said inner space,
a metal member; and
a joining material for joining said metal member and a sealing member said joining material comprising at least an oxynitride glass containing silicon atoms;
wherein said oxynitride glass comprises silicon atoms in a content of not lower than 7 atomic percent and not higher than 15 atomic percent.

19. The assembly of claim 15, wherein said metal member is tube-shaped, at least a part of said electrode system is inserted in said metal member, and a clearance of an inner wall of said metal member and an outer wall of said electrode system is not smaller than 30 μm and not larger than 150 μm.

20. The assembly of claim 16, wherein said metal member is tube-shaped, at least a part of said electrode system is inserted in said metal member, and a clearance of an inner wall of said metal member and an outer wall of said electrode system is not smaller than 30 μm and not larger than 150 μm.

21. The assembly of claim 17, wherein said metal member is tube-shaped, at least a part of said electrode system is inserted in said metal member, and a clearance of an inner wall of said metal member and an outer wall of said electrode system is not smaller than 30 μm and not larger than 150 μm.

22. The assembly of claim 18, wherein said metal member is tube-shaped, at least a part of said electrode system is inserted in said metal member, and a clearance of an inner wall of said metal member and an outer wall of said electrode system is not smaller than 30 μm and not larger than 150 μm.

23. A high pressure discharge lamp comprising said assembly of claim 15, wherein said ionizable light-emitting substance and said starter gas are contained in said inner space.

24. A high pressure discharge lamp comprising said assembly of claim 16, wherein said ionizable light-emitting substance and said starter gas are contained in said inner space.

25. A high pressure discharge lamp comprising said assembly of claim 17, wherein said ionizable light-emitting substance and said starter gas are contained in said inner space.

26. A high pressure discharge lamp comprising said assembly of claim 18, wherein said ionizable light-emitting substance and said starter gas are contained in said inner space.

27. A method of producing a joined body of a first and second members, comprising:
   a joining material between said first and second members, said joining material containing an oxynitride glass; and
   said method comprising the step of subjecting raw material for said oxynitride glass to a heat treatment under atmosphere of hydrogen and nitrogen at a volume ratio of 25:75 to 50:50 to generate said oxynitride glass.

28. The method of claim 27, wherein said second member comprises an oxide containing a rare earth element, and 1 weight part of said raw material is subjected to said heat treatment with 0.15 to 1.50 weight parts of silica.

29. The method of claim 27, wherein said second member comprises an oxide containing a rare earth element, and said atmosphere for said heat treatment has a dew point of not lower than $-5°$ C. and not higher than $+30°$ C.

* * * * *